United States Patent
Kaji et al.

(10) Patent No.: US 6,751,212 B1
(45) Date of Patent: Jun. 15, 2004

(54) MULTIMEDIA DATA COMMUNICATION SYSTEM

(75) Inventors: Akemi Kaji, Tokyo (JP); Toshio Murai, Ichikawa (JP); Shuichi Sato, Sagamihara (JP); Katsunori Yoshihara, Tokyo (JP); Shinichi Kashimoto, Tokyo (JP); Satoshi Machida, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/255,658

(22) Filed: Feb. 23, 1999

(30) Foreign Application Priority Data

| Feb. 24, 1998 | (JP) | 10-042112 |
| Dec. 14, 1998 | (JP) | 10-354371 |

(51) Int. Cl.$^7$ ............................................. H04L 12/66
(52) U.S. Cl. .................. 370/352; 370/354; 379/373.01; 379/374.02
(58) Field of Search ....................... 379/373.01, 373.02, 379/373.03, 374.01, 374.02, 162, 393, 375.01, 361, 257, 372; 370/352, 354

(56) References Cited

U.S. PATENT DOCUMENTS

| 4,277,649 A | * | 7/1981 | Sheinbein | 379/211.02 |
| 5,410,591 A | * | 4/1995 | Takahashi | 379/215.01 |
| 5,434,852 A | * | 7/1995 | La Porta et al. | 370/385 |
| 5,473,679 A | * | 12/1995 | La Porta et al. | 379/201.05 |
| 5,509,010 A | * | 4/1996 | La Porta et al. | 370/397 |
| 5,590,186 A | * | 12/1996 | Liao et al. | 379/211.02 |
| 6,001,052 A | * | 12/1999 | Jung | 455/416 |
| 6,031,905 A | * | 2/2000 | Furman et al. | 379/215.01 |
| 6,078,653 A | * | 6/2000 | Jean-Claude et al. | 379/167.01 |
| 6,122,346 A | * | 9/2000 | Grossman | 379/68 |
| 6,219,415 B1 | * | 4/2001 | Deutsch et al. | 379/215.01 |
| 6,324,179 B1 | * | 11/2001 | Doshi et al. | 370/395.61 |
| 6,452,937 B1 | * | 9/2002 | Borkovic et al. | 370/442 |

FOREIGN PATENT DOCUMENTS

WO    WO 98/58475    12/1998

OTHER PUBLICATIONS

Katsunori Yoshinara et al., U.S. patent application Ser. No. 09/242,455, entitled "Multimedia Information Communication System," filed Feb. 17, 1999.

* cited by examiner

*Primary Examiner*—Dang Ton
*Assistant Examiner*—Melanie Jagannathan
(74) *Attorney, Agent, or Firm*—Finnegan, Henderson, Farabow, Garrett & Dunner, L.L.P.

(57) ABSTRACT

A sound element database is installed in an analog telephone hub. When hold operation or the like is performed on an analog telephone during voice communication, the analog telephone hub selectively reads out necessary sound element data from the sound element database, and sends the sound element data or the type information of the sound element data to an analog telephone on the held party side through a LAN. In an analog telephone hub on the held part side, an audible sound is generated on the basis of sound element data read out from the sound element database on the basis of the sent sound element data or the sound element data type information. This audible sound is supplied to the analog telephone on the held party side to be output. With this operation, an audible sound indicating the operation state of a communication terminal can be effectively transmitted to the communication terminal of the other party.

26 Claims, 18 Drawing Sheets

MULTIMEDIA DATA COMMUNICATION SYSTEM

BACKGROUND OF THE INVENTION

The present invention relates to a multimedia data communication system which includes a plurality of types of communication terminal devices accommodated in a network including a LAN (Local Area Network) as a core network and allows multimedia data communication.

This application is based on Japanese Patent Application No. 10-42112, filed Feb. 24, 1998 and Japanese Patent Application No. 10-354371, filed Dec. 14, 1998, the contents of both of which are incorporated herein by reference.

In a conventional PBX (private branch exchange) network system, voice communication terminal devices are accommodated as extension terminals in a PBX or button telephone main apparatus. In this system, the PBX or button telephone main apparatus performs switching connection between these extension terminals and an external communication network such as a public network and between the extension terminals, thereby allowing voice communication. In addition, data terminals such as personal computers are connected to a LAN to allow data transmission between the personal computers through the LAN. Furthermore, another system is proposed, in which a voice communication system using a PBX or button telephone main apparatus is linked to a data communication system using a LAN by using a gateway.

In such a conventional PBX network system, however, different communication infrastructures must be installed for the voice communication system and the data communication system. In addition, the voice communication system is of a centralized control type using the PBX or button telephone main apparatus, system down tends to occur. In order to prevent this, the PBX must be made duplex. This increases the system configuration and the investment made by the user.

The present inventor has therefore proposed a system in Japanese Patent Application No. 9-161722, which published as WO 98/58475 and is related to U.S. application Ser. No. 09/242,455, in which a plurality of types of media terminals are accommodated in a network including a LAN as a core network through a communication interface. This communication interface performs protocol conversion, data format conversion, and the like to allow multimedia data communication between each media terminal and an external communication network as well as between the plurality of types of media terminals.

In this system, for example, when the user of one of communication terminal devices performs hold operation during voice communication, an audible sound informing that the hold operation is performed must be generated at the communication terminal device of the other party. In addition, when a communication terminal device is set in the off-hook state, a dial tone informing that the off-hook state is set must be generated. Furthermore, there are demands to notify a call originating party of the state and information of the called party if the called party is in communication by using voice messages during voice communication. As described above, in a multimedia data communication system, there are occasions when users want to generate audible sounds from communication terminal devices. At present, however, no effective means for generating audible sounds have been developed.

As described above, in conventional multimedia data communication systems, no effective means for notifying the operation state of a communication terminal device to the communication terminal device of the other party by using audible sounds has been proposed.

BRIEF SUMMARY OF THE INVENTION

Accordingly, it is an object of the present invention to provide a multimedia data communication system which can effectively notify the communication terminal device of the other party of the operation state of a given communication terminal device by using audible sounds.

It is another object of the present invention to provide a multimedia data communication system which can reduce the load on a network in notifying the communication terminal device of the other party of the operation state of a given terminal device by using audible sounds.

According to the present invention, there is provided a following multimedia data communication systems.

(1) A multimedia data communication system comprises:

- communication terminals for transmitting/receiving information data in accordance with a first communication protocol;
- a communication network for transmitting information data in accordance with a second communication protocol;
- communication interfaces each converting a communication protocol between communication terminals and the communication network;
- a sound element database for storing sound element data for generating an audible sound indicating an operation state of the communication terminal; and
- a sound generator for, when a first communication terminal outputs a request to generate an audible sound indicating the operation state thereof from a second communication terminal, reading out sound element data corresponding to the request from the sound element database, and transferring the sound element data to the second communication terminal, thereby causing the second communication terminal to generate an audible sound corresponding to the sound element data.

(2) A multimedia data communication system of the present invention is the multimedia data communication system described in (1), in which the sound generator comprises:

- a sending circuit, provided in the communication interface to which the first communication terminal is connected, for reading out corresponding sound element data from the sound element database, and sending the readout sound element data to the second communication terminal through the communication network; and
- sound generator, provided in the communication interface to which the second communication terminal is connected, for generating an audible sound corresponding to the sound element data sent from the sending circuit, and causing the second communication terminal to output the audible sound.

(3) A multimedia data communication system of the present invention is the multimedia data communication system described in (1), in which the sound generator comprises:

- a sending circuit, provided in the communication interface to which the first communication terminal is connected, for sending type information of sound element data corresponding to an audible sound, for which the first communication terminal has made a generation request, to the second communication terminal through the communication network; and sound generator, provided in the communication interface to which the second communication terminal is connected, for reading out from the sound element database sound element data corresponding to the sound element data type information sent from the sending circuit, generating an audible sound corresponding to the readout sound element data, and causing the second communication terminal to output the audible sound.

According to the present invention associated with (1) to (3), necessary sound element data are registered in the sound element database in advance. When a request to generate an audible sound is output from a communication terminal, the corresponding sound element data is selectively read out from the sound element database and sent to the terminal device of the other party. As a result, an audible sound corresponding to the sound element data is generated by the communication terminal. This obviates the necessity to directly transmit an audible sound between communication terminals upon digitizing it, thus allowing efficient transmission and generation of audible sounds.

(4) A multimedia data communication system comprises:

communication terminals for transmitting/receiving information data in accordance with a first communication protocol;

a communication network for transmitting information data in accordance with a second communication protocol;

first communication interfaces each converting a communication protocol between the communication terminals and the communication network; and a second communication interface for converting a communication protocol between the communication network and an external communication network for transmitting information data in accordance with a third communication protocol, the second communication interface including:

a sound element database for storing sound element data for generating an audible sound indicating an operation state of the communication terminal; and a sound generator for, when the first communication terminal outputs a request to generate an audible sound indicating an operation state of the first communication terminal from the second communication terminal, reading out sound element data corresponding to the request from the sound element database, transferring the data to the second communication terminal, and causing the second communication terminal to generate an audible sound corresponding to the sound element data.

(5) A multimedia data communication system of the present invention is the multimedia data communication system described in (4), in which the sound generator comprises:

a first sending circuit, provided in a first communication interface to which the first communication terminal is connected, for sending type information of sound element data corresponding to an audible sound requested by the first communication terminal to the second communication interface through the communication network;

a data reading circuit, provided in the second communication interface, for reading out from the sound element database sound element data corresponding to the sound element data type information sent from the first sending circuit, and transferring the readout sound element data to the first communication interface, connected to the first communication terminal, through the communication network;

a second sending circuit, provided in the first communication interface to which the first communication terminal is connected, for sending the sound element data transferred from the second communication interface to the second communication terminal through the communication network; and a sound generator, provided in the first communication interface to which the second communication terminal is connected, for generating an audible sound corresponding to the sound element data sent from the second sending circuit and causing the second communication terminal to output the audible sound.

(6) A multimedia data communication system of the present invention is the multimedia data communication system described in (4), in which the sound generator comprises:

a first sending circuit, provided in a first communication interface to which the first communication terminal is connected, for sending type information of sound element data corresponding to an audible sound requested by the first communication terminal to the second communication interface through the communication network;

a second sending circuit, provided in the second communication interface, for reading out from the sound element database sound element data corresponding to the sound element data type information sent from the first sending circuit, and sending the readout sound element data to the second communication interface through the communication network; and a sound generator, provided in the first communication interface to which the second communication terminal is connected, for generating an audible sound corresponding to the sound element data sent from the second sending circuit and causing the second communication terminal to output the audible sound.

(7) A multimedia data communication system of the present invention is the multimedia data communication system described in (4), in which the sound generator comprises:

a first transfer circuit, provided in a first communication interface to which the first communication terminal is connected, for transferring type information of sound element data corresponding to an audible sound requested by the first communication terminal to the first communication interface, to which the second communication terminal is connected, through the communication network;

a sending circuit, provided in the first communication interface to which the second communication terminal is connected, for sending the sound element data type information transferred from the first transfer circuit to the second communication interface through the communication network;

a second transfer circuit, provided in the second communication interface, for reading out sound element data from the sound element database in accordance with the sound element data type information sent from the sending circuit, and transferring the readout sound element data to the first communication interface, to which the first communication terminal, through the communication network; and a sound generator, provided in the first communication interface to which the second communication terminal is connected, for generating an audible sound corresponding to the sound element data transferred from the second transfer circuit and causing the second communication terminal to output the audible sound.

(8) A multimedia data communication system comprises:

communication terminals for transmitting/receiving information data in accordance with a first communication protocol;

a communication network for transmitting information data in accordance with a second communication protocol;

communication interfaces each converting a communication protocol between communication terminals and the communication network; and a server connected to the communication network and having a database for storing identification information and address information of each of the communication interfaces, the server including:

a sound element database for storing sound element data for generating an audible sound indicating an operation state of the communication terminal; and a sound generator for, when a first communication terminal outputs a request to generate an audible sound indicating an operation state of the first communication terminal from a second communication terminal, reading out sound element data corresponding to the request from the sound element database, transferring the sound element data to the second communication terminal, and causing the second communication terminal to generate an audible sound corresponding to the sound element data.

According to the present invention associated with (4) to (8), it is apparent that audible sounds be efficiently transmitted and generated. In addition, since the sound element database is provided in the second communication interface or the server for outside line connection, sound element database need not be provided in communication interfaces for connection of communication terminals. This can simplify management of sound element data.

(9) A multimedia data communication system of the present invention is the multimedia data communication system described in (1), (4), or (8), which further comprises audible sound stopping circuit for stopping generation of an audible sound by the second communication terminal.

According to the present invention associated with (9), an audible sound generated by the communication terminal of the other party can be properly stopped in accordance with the type of notification.

(10) A multimedia data communication system of the present invention is the multimedia data communication system described in (9), in which the audible sound stopping circuit comprises:

a sending circuit, provided in the communication interface to which the first communication terminal is connected, for, when the first communication:terminal outputs an audible sound stopping request, sending the stopping request to the second communication terminal through the communication network; and a stopping circuit, provided in the communication interface to which the second communication terminal is connected, for stopping generation of the audible sound in response to the audible sound stopping request output from the sending circuit.

According to the present invention associated with (10), since an audible sound can be stopped by sending a stop instruction from the communication terminal which has designated generation of the audible sound, an audible sound indicating hold operation, for example, can be kept generated during a hold period.

(11) A multimedia data communication system of the present invention is the multimedia data communication system described in (9), in which the audible sound stopping circuit is provided in the communication interface to which the second communication terminal is connected, monitors a generation time of an audible sound in the second communication terminal, and stops generation of the audible sound when the generation time exceeds a predetermined time.

According to the present invention associated with (11), since an audible sound can be automatically stopped without sending any stop instruction from the communication terminal which has designated generation of the audible sound, this system is suited for notification of service information, e.g., a wake-up call.

(12) A multimedia data communication system of the present invention is the multimedia data communication system described in (1), (4) or (8), which further comprises sound element data setting control circuit for, when a sound element data registration or deletion request is sent from the communication terminal, registering or deleting sound element data in or from the sound element database in accordance with contents of the request.

According to the present invention associated with (12), registration or deletion of sound element data with respect to the sound element database can be remotely and easily performed from a communication terminal.

(13) A multimedia data communication system of the present invention is the multimedia data communication system described in (1), (4) or (8), in which the sound element database stores a sound element data element for generating a one-cycle audible sound, and the sound generator generates a continuous audible sound by repeatedly using the sound element data element.

(14) A multimedia data communication system of the present invention is the multimedia data communication system described in (13), in which the sound generator comprises a sound element data memory for storing the sound element data element.

(15) A multimedia data communication system of the present invention is the multimedia data communication system described in (1), (4), or (8), in which the sound element database stores sound element data for generating a hold sound.

(16) A multimedia data communication system of the present invention is the multimedia data communication system described in (1), (4), or (8), in which the sound element database stores sound element data for generating a dial tone.

(17) A multimedia data communication system of the present invention is the multimedia data communication system described in (1), (4), or (8), in which the sound element database stores sound element data for generating a voice message indicating an operation state of the first communication terminal.

(18) A multimedia data communication system of the present invention is the multimedia data communication system described in (1), (4), or (8), in which the sound element database stores sound element data for generating a ring back tone.

According to the present invention associated with (13) to (18), in order to generate a continuous audible sound indicating the operation state of a communication terminal, there is no need to continuously transmit sound element data through a network or continuously access a database storing sound element data. This allows efficient transmission and generation of audible sounds. In addition, the operation state of a communication terminal can be notified more intelligibly by notifying the operation state of the communication terminal using a voice message as well as a tone.

(19) A multimedia data communication system of the present invention has communication terminals connected to each other, each communication terminal comprising:

a sound element database for storing sound element data for generating an audible sound indicating an operation state of the communication terminal;

a sending circuit for sending sound element datastored in the sound element database to another communication terminal; and a sound generator for generating an audible sound on the basis of the sound element data, wherein the audible sound is composed of a continuous multi-cycle sound, the sound element database stores sound element data corresponding to a one-cycle audible sound, and the communication terminal, which stores sound element data, transmits one-cycle sound element data for generating an audible sound to another communication terminal to cause the communication terminal which has received the sound element data to continuously use the one-cycle sound element data and generate an audible sound composed of a continuous multi-cycle sound.

(20) A multimedia data communication system of the present invention has communication terminals connected to each other, each communication terminal comprising:

a sound element database for storing sound element data for generating an audible sound indicating an operation state of the communication terminal; and a sound generator for generating an audible sound on the basis of the sound element data, wherein the audible sound is composed of a continuous multi-cycle sound, the sound element database stores sound element data corresponding to a one-cycle audible sound, and the communication terminal continuously uses the one-cycle sound element data to generate an audible sound composed of a continuous multi-cycle sound on the basis of a request from another communication terminal or an operation state of the communication terminal.

(21) A multimedia communication system of the present invention has communication terminals connected to each other, each communication terminal comprising:

a sound element data managing device including sound element database for storing sound element data for generating an audible sound indicating an operation state of the communication terminal, and a sending circuit for sending sound element data stored in the sound element database to another communication terminal; and a sound generator for generating an audible sound on the basis of the sound element data, wherein the audible sound is composed of a continuous multi-cycle sound, the sound element database stores sound element data corresponding to a one-cycle audible sound, and the sound element data managing device transmits one-cycle sound element data to a designated communication terminal, on the basis of a request from the communication terminal, to cause the communication terminal which has received the sound element data to continuously use the one-cycle sound element data and generate an audible sound composed of a continuous multi-cycle sound.

(22) A multimedia data communication system of the present invention is the multimedia data communication system described in (19), (20), or (21), in which the sound element database stores sound element data for generating a hold sound.

(23) A multimedia data communication system of the present invention is the multimedia data communication system described in (19), (20), or (21), in which the sound element database stores sound element data for generating a dial tone.

(24) A multimedia data communication system of the present invention is the multimedia data communication system described in (19), (20), or (21), in which the sound element database stores sound element data for generating a voice message indicating an operation state of the communication terminal.

(25) A multimedia data communication system of the present invention is the multimedia data communication system described in (19), (20), or (21), in which the sound element database stores sound element data for generating a ring back tone.

(26) A multimedia data communication system of the present invention has communication terminals connected to each other, comprising:

a setting circuit for setting user information for identification information of each communication terminal;

a recognizing circuit for recognizing a state of each communication terminal; and a converting circuit for converting user information and state of each communication terminal into voice messages, wherein when a first communication terminal is to originate a call to a second communication terminal, the first communication terminal reads out user information of the second communication terminal, recognizes the state of the second communication terminal, and then converts the user information and the state into voice messages, thereby notifying a user of the first communication terminal of information associated with the second communication terminal.

(27) A multimedia data communication system of the present invention has communication terminals connected to each other, comprising:

a setting circuit for setting user information for identification information of each communication terminal;

a recognizing circuit for recognizing a state of each communication terminal; and a converting circuit for converting user information and state of each communication terminal into voice messages, wherein when a first communication terminal is to originate a call to a second communication terminal, the second communication terminal reads out user information thereof, recognizes the state of the second communication terminal, and then converts the user information and state into voice messages, thereby transmitting the voice messages to the first communication terminal.

According to the present invention associated with (19) to (27), in order to generate a continuous audible sound indicating the operation state of a communication terminal, there is no need to continuously transmit sound element data through a network or continuously access a database storing sound element data. This allows efficient transmission and generation of audible sounds. In addition, the operation state of a communication terminal can be notified more intelligibly by notifying the operation state of the communication terminal using a voice message as well as a tone.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention in which.

DETAILED DESCRIPTION OF THE INVENTION

A preferred embodiment of a multimedia data communication system according to the present invention will now be described with reference to the accompanying drawings.

[First Embodiment]

Figure 1:
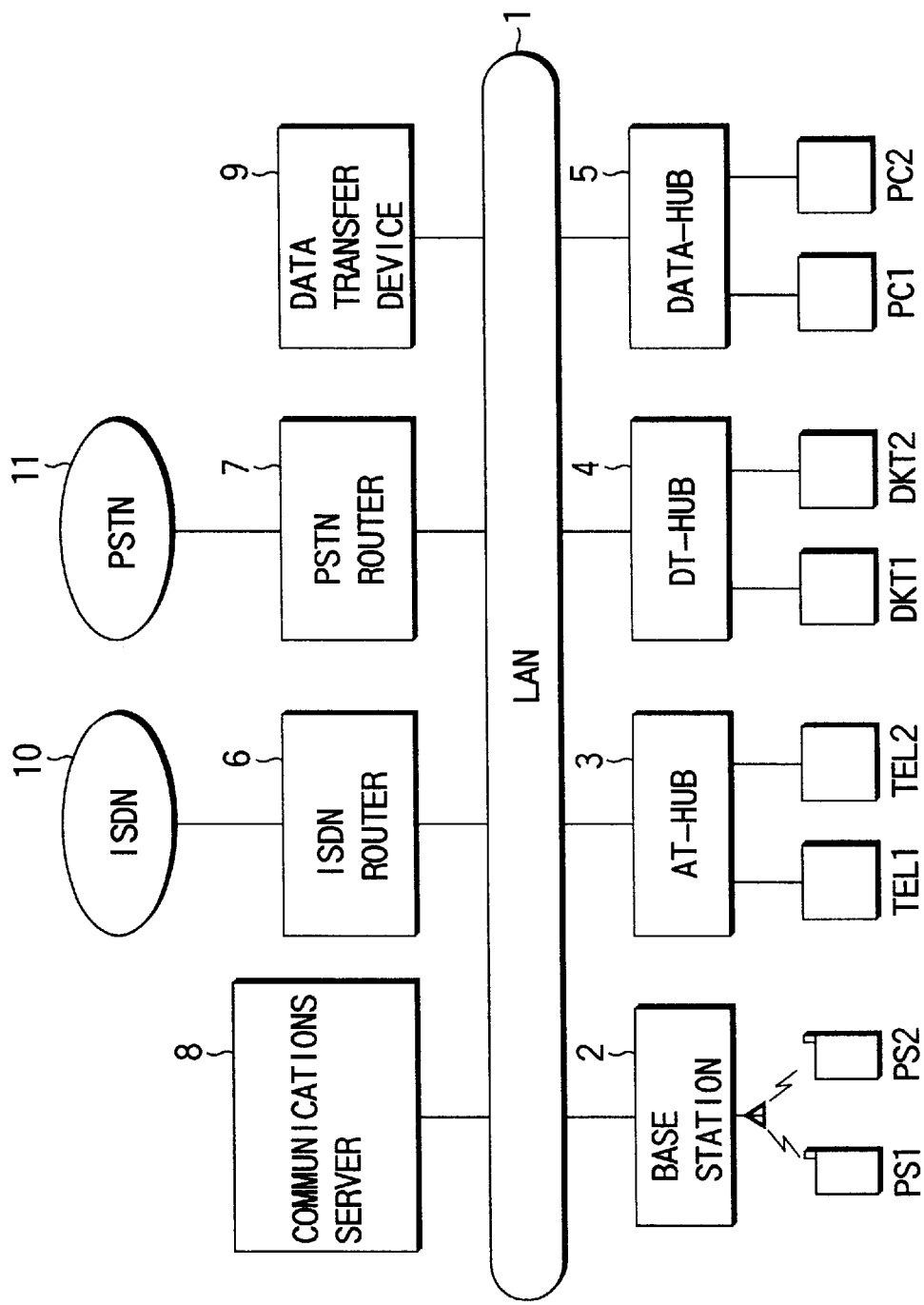
FIG. 1 is a block diagram showing the overall arrangement of a multimedia data communication system according to the present invention.

FIG. 1 shows the schematic arrangement of a multimedia data communication system according to the first embodiment of the present invention.

A core communication network (LAN) 1 as the core of this system uses an Ethernet having a data transmission capacity of 100 Mbits or 1 Gbit. A plurality of base stations 2, a plurality of analog telephone hubs (AT-HUBs) 3, a plurality of digital telephone hubs (DT-HUBs) 4, and a plurality of data terminal hubs (DATA-HUBs) 5 are connected to the LAN 1. For illustrative convenience, FIG. 1 shows one each of the base station 2 and the hubs 3, 4, and 5. However, the present invention may include a plurality of each of these components.

The base station 2 functions as a base station for a portable telephone system, e.g., a PHS (Personal Handyphone System). A plurality (two in this case; the same applies to the following components) of radio terminals PS1 and PS2 are connected to the base station 2 through radio channels. Analog telephones TEL1 and TEL2 are connected to the AT-HUB 3. Digital telephones DKT1 and DKT2 are connected to the DT-HUB 4. The digital telephones DKT1 and DKT2 are digital multifunction telephones. Personal computers PC1 and PC2 are connected to the DATA-HUB 5.

Each of the radio terminals PS1 and PS2, analog telephones TEL1 and TEL2, digital telephones DKT1 and DKT2, and personal computers PC1 and PC2 is used as an extension communication terminal device.

An ISDN router 6 and a PSTN router 7 are connected, as communication interfaces for outside line connection, to the LAN 1. The ISDN router 6 connects the LAN 1 to an integrated services digital network (ISDN) 10. The PSTN router 7 connects the LAN 1 to a public switched telephone network (PSTN) 11.

A communication server 8 and a data transfer device 9 are also connected to the LAN 1. The communication server 8 includes a network interface (I/F) for interfacing with the LAN 1, a driver for driving a hard disk unit and the like (not shown), an OS (Operating System), and an application program. The communication server 8 stores in the database address information of the respective communication interfaces 2, 3, 4, and 5 for extension terminal connection and the extension communication terminal devices connected thereto. Upon reception of inquiries about addresses from the respective communication interfaces 2, 3, 4, and 5, the communication server 8 searches the database and notify the devices that have made the inquires of the search results.

The data transfer device 9 is, for example, a personal computer, which is used to transfer and register sound element data required to generate an audible sound such as a hold sound in a sound element database (to be described later) placed in the AT-HUB 3 and is also used to delete unnecessary sound element data.

Figure 2:
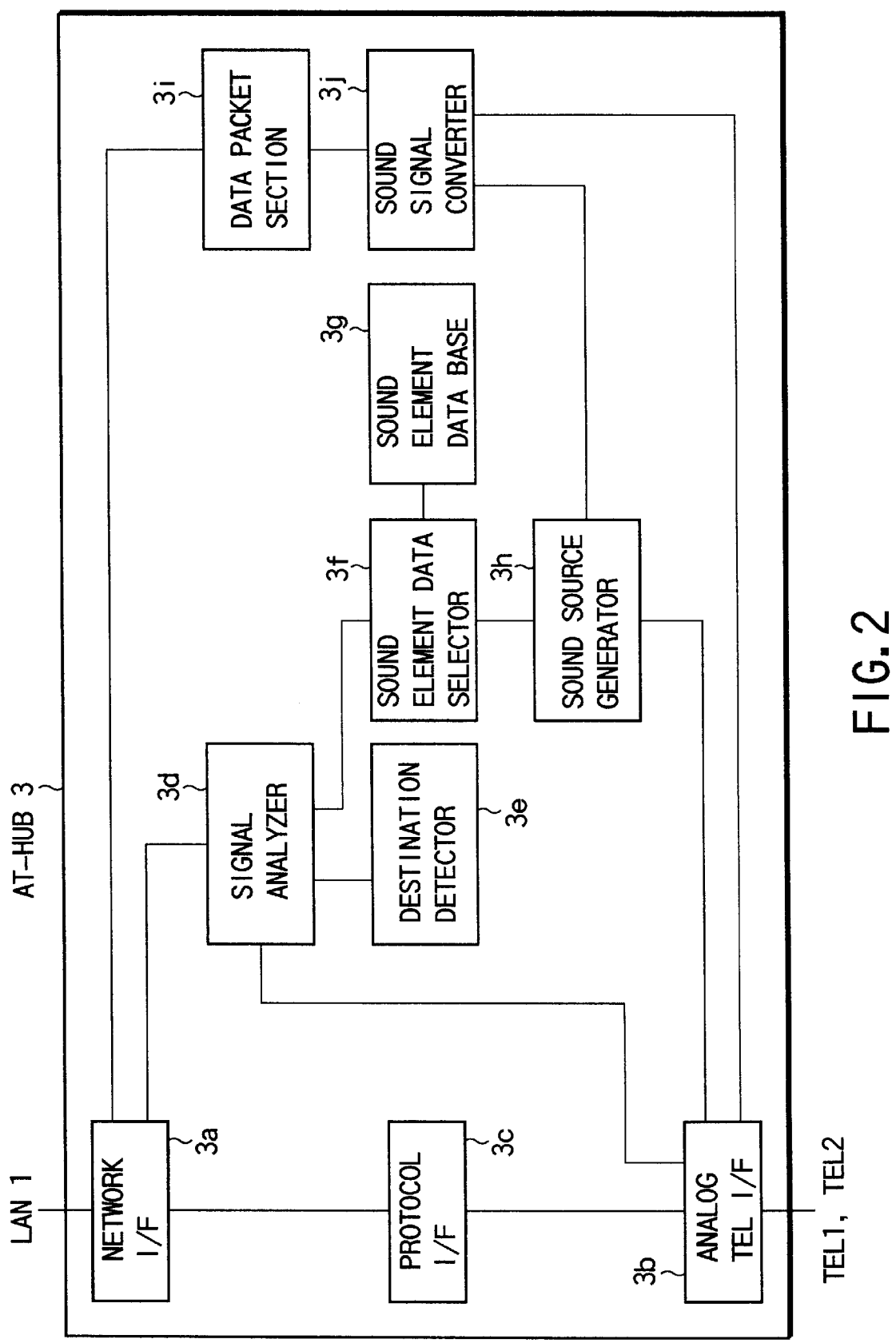
FIG. 2 is a block diagram showing the functional arrangement of an analog telephone hub (AT-HUB) in a multimedia data communication system according to the first embodiment of the present invention.

The AT-HUB 3 has the following arrangement. FIG. 2 is a block diagram showing the functional arrangement of the AT-HUB 3. The AT-HUB 3 includes a network I/F 3a for interfacing with the LAN 1, an analog telephone I/F 3b, and a protocol I/F 3c. The AT-HUB 3 also includes a data packet section 3i and a sound signal converter 3j.

The network I/F 3a controls data transmission to/from the LAN 1 in accordance with the network protocol prescribed in the LAN 1. The analog telephone I/F 3b controls communication in accordance with the analog telephone protocol prescribed between the analog telephones TEL1 and TEL2. The protocol I/F 3c performs protocol conversion between the network protocol and the analog telephone communication protocol. The sound signal converter 3j converts sound data received from the analog telephones TEL1 and TEL2 and an audible sound like a hold sound generated by a sound source generator 3h (to be described later) into data in the form suited to packeting. The data packet section 3i generates packets by dividing the sound data and audible data from the sound signal converter 3j into blocks each having a predetermined block length.

The AT-HUB 3 includes a signal analyzer 3d, a destination detector 3e, a sound element data selector 3f, a sound element database 3g in which various sound element data required to generate a tone signal like a hold sound and an audible sound like talkie are stored, and the sound source generator 3h.

Upon reception of signals from the LAN 1 and analog telephones TEL1 and TEL2, the signal analyzer 3d analyzes the types of signals. For example, the signal analyzer 3d analyzes and determines whether an incoming signal is a general sound packet, request data such as a hold request or reset request, or another type of control data. The destination detector 3e detects a communication terminal device of the other party and a hub to which the communication terminal device is connected from the destination address contained in the incoming signal.

The sound element data selector 3f determines the type of sound element data in accordance with the type and contents of incoming request data, and selectively reads out corresponding sound element data from the sound element database 3g. For example, upon reception of hold requests from the analog telephones TEL1 and TEL2, the sound element data selector 3f selects sound element data for hold sounds. Upon reception of request data containing the type of sound element data from the AT-HUB 3 through the LAN 1, the sound element data selector 3f selects sound data corresponding to the type.

Figure 3:
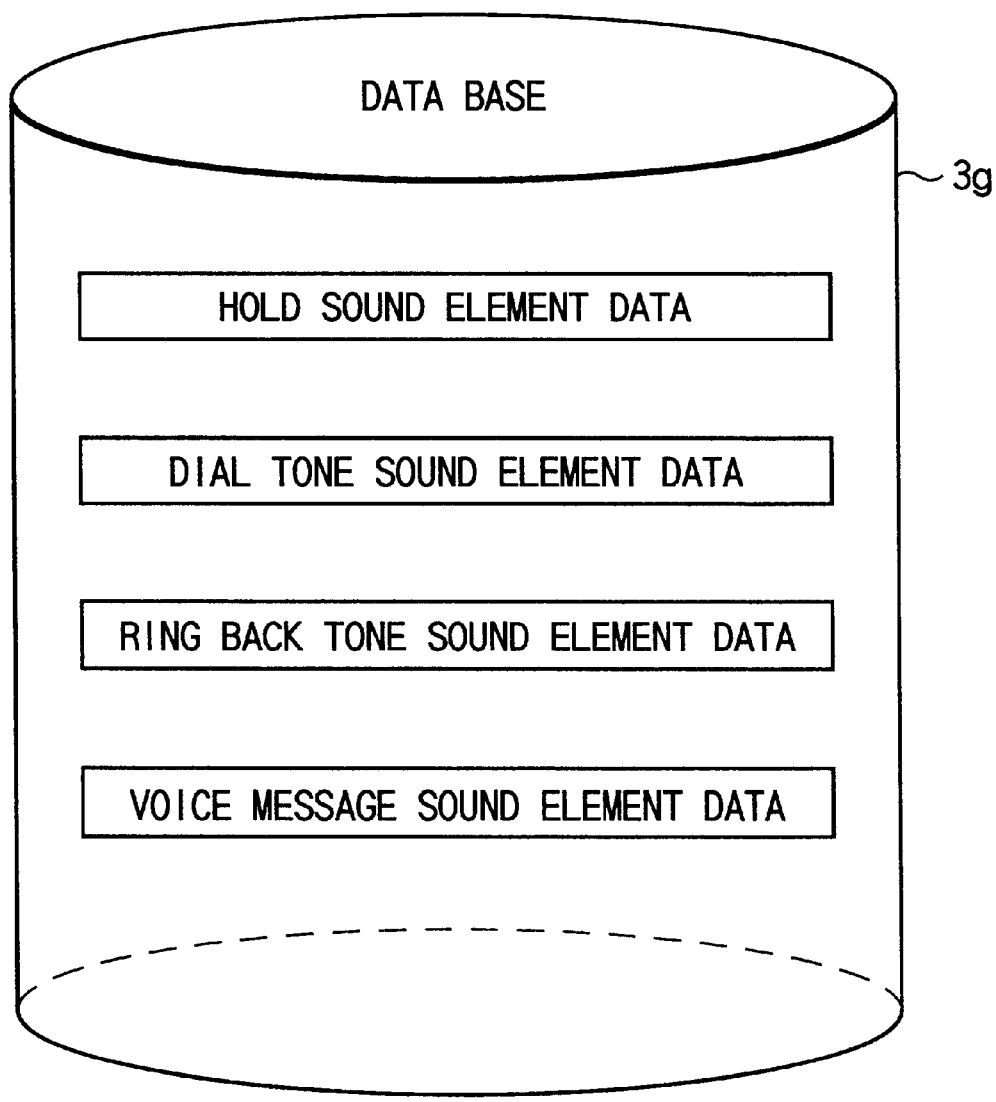
FIG. 3 is a view showing the arrangement of a sound element database.

As shown in FIG. 3, the sound element database 3g manages hold sound element data, dial tone sound element data, ring back tone sound element data, voice message sound element data indicating the operation state of a called terminal, and the like. Sound element data to be identified includes a tone, data input by a person through a microphone, and synthetic sound data generated by a voice synthesis techniques and the like.

The sound source generator 3h generates audible sounds corresponding to the sound element data selected by the sound element data selector 3f, and sends the audible sounds from the analog telephone I/F 3b to the analog telephones TEL1 and TEL2.

Audible sound generating operation of the system having the above arrangement will be described with reference to the following two examples. Assume that in each example, the analog telephone TEL1 connected to an AT-HUB 31 performs hold operation during voice communication, and a hold sound is generated from the analog telephone TEL2 of the other party, which is connected to an AT-HUB 32.

EXAMPLE 1-1

Figure 4:
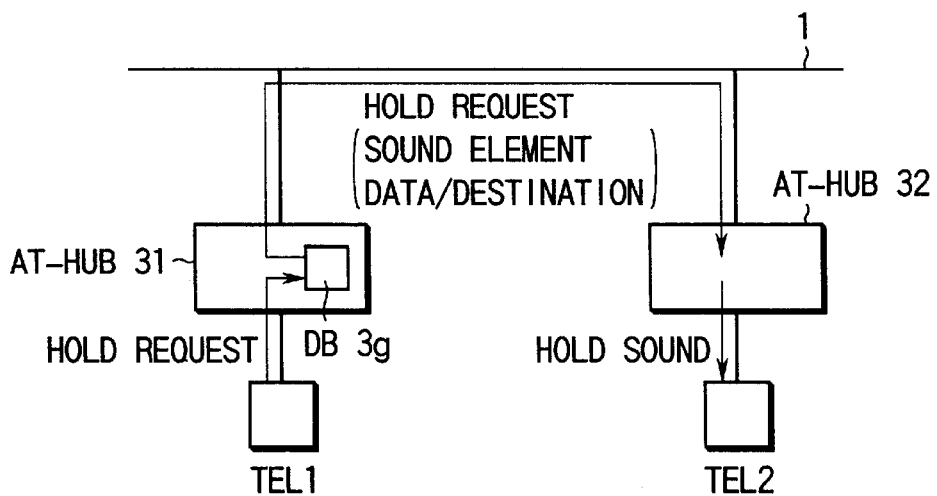
FIG. 4 is a view showing a signal transfer route to explain audible sound generating operation in the first example of the first embodiment.
Figure 5:
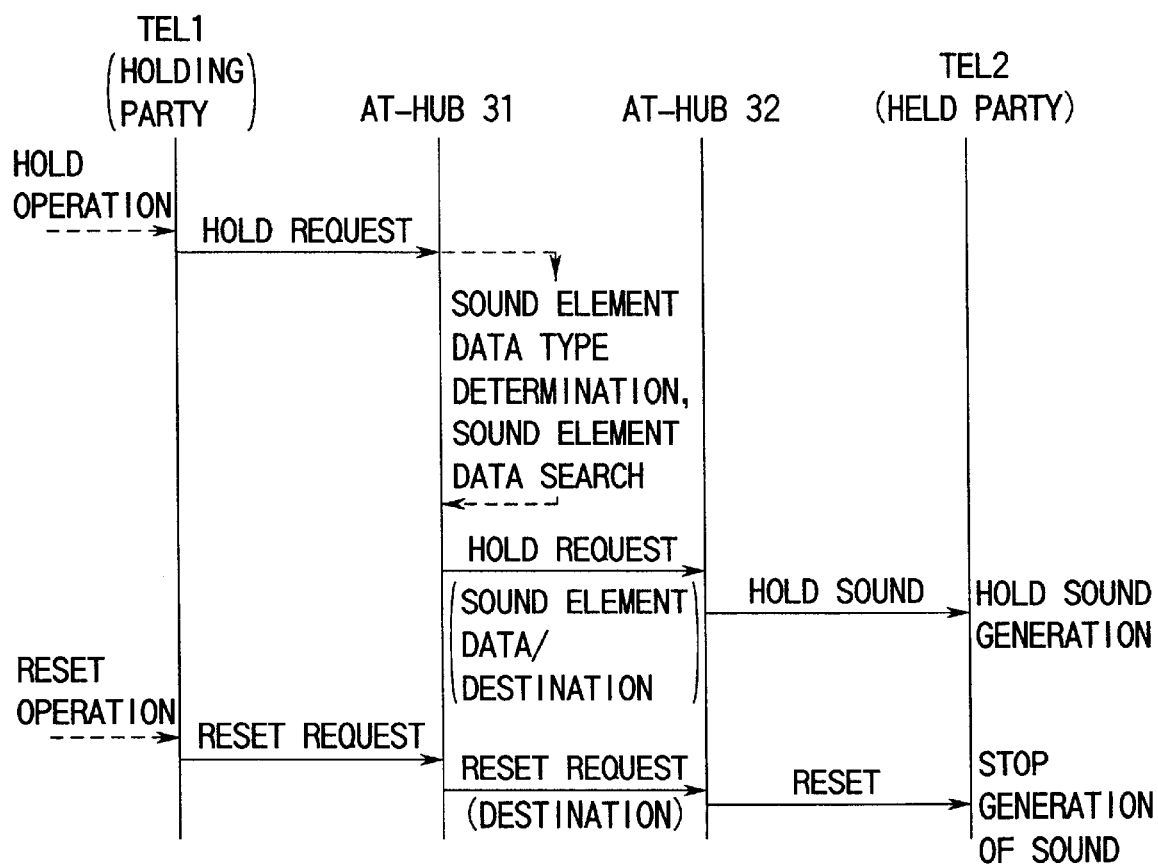
FIG. 5 is a sequence chart for explaining audible sound generating operation in the first example of the first embodiment.

As shown in FIGS. 4 and 5, when the analog telephone TEL1 performs hold operation during voice communication with the analog telephone TEL2, a hold request is output from the analog telephone TEL1. Upon reception of the hold request, the signal analyzer 3d in the AT-HUB 31 determines that the received request is a hold request. The sound element data selector 3f determines the type of hold sound element data on the basis of the determination result, and selectively reads out the corresponding sound element data from the sound element database 3g. The hold request in which the sound element data and the destination information of the analog telephone TEL2 on the held party side are inserted is output from the network I/F 3a to the LAN 1 to be sent to the analog telephone TEL2 of the other party.

In the AT-HUB 32 to which the analog telephone TEL2 of the other party is connected, when the hold request address to the analog telephone TEL2 accommodated in the AT-HUB 32 is received through the LAN 1, the sound element data is extracted from the hold request, and a hold sound is generated by the sound source generator 3h on the basis of the sound element data. The hold sound is then sent from the analog telephone I/F 3b to the analog telephone TEL2 on the held party side.

As a result, the hold sound is output from the analog telephone TEL2 of the other party to allow the user of the analog telephone TEL2 to recognize that the analog telephone TEL1 is on hold.

When reset operation is performed at the analog telephone TEL1 on the holding party side, a reset request is output from the analog telephone TEL1. In the AT-HUB 31, request data corresponding to the reset request is generated, and the reset request data is output from the network I/F 3a to the LAN 1 to be sent to the analog telephone TEL2.

At the AT-HUB 32 to which the analog telephone TEL2 on the held party side is connected, when the reset request data addressed to the analog telephone TEL2 connected to the AT-HUB 32 is received through the LAN 1, the generation of the hold sound by the sound source generator 3h is stopped. As a result, the hold sound output from the analog telephone TEL2 on the held party side is stopped. Thereafter, the voice communication between the analog telephones TEL1 and TEL2 is resumed.

Note that an lapsed time since the generation of a hold sound may be measured at the analog telephone TEL2 on the held party side or AT-HUB 32 to automatically stop the generation of the hold sound and perform reset operation when the elapsed time reaches a predetermined time. With this operation, if the user of the analog telephone TEL1 on the holding party side forgets about canceling the hold operation, the held state can be automatically canceled. In addition, after the reset operation, a hold check request may be output to the AT-HUB 31 on the holding party side to cause the analog telephone TEL1 on the holding party side to generate a hold check sound.

EXAMPLE 1-2

Figure 6:
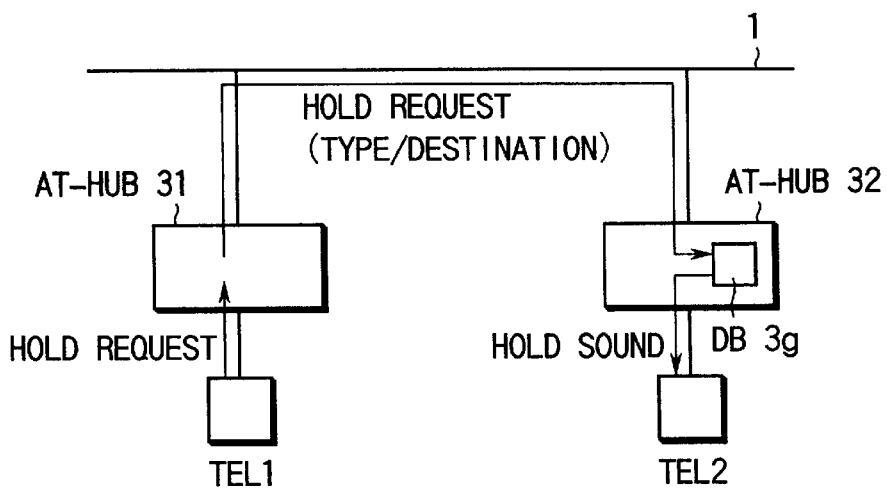
FIG. 6 is a view showing a signal transfer route to explain audible sound generating operation in the second example of the first embodiment.
Figure 7:
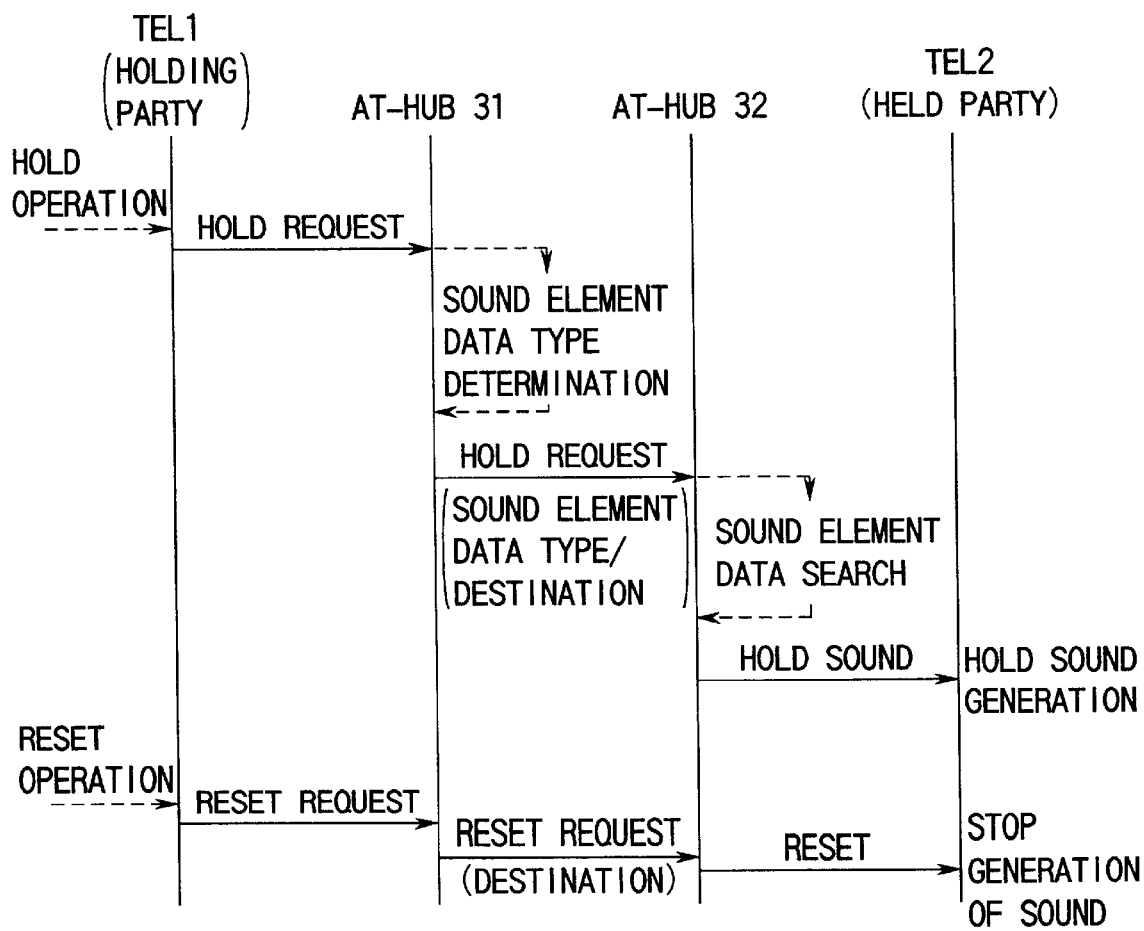
FIG. 7 is a sequence chart for explaining audible sound generating operation in the second example of the first embodiment.

As shown in FIGS. 6 and 7, a hold request is output from the analog telephone TEL1. Upon reception of the hold request, the signal analyzer 3d in the AT-HUB 31 determines that the request is a hold request, and the sound element data selector 3f determines the type of hold sound element data on the basis of the determination result. Thereafter, the hold request in which the sound element data type information and the destination information of the analog telephone TEL2 on the held party side are inserted is output from the network I/F 3a to the LAN 1 to be sent to the analog telephone TEL2 of the other party.

In the AT-HUB 32 accommodating the analog telephone TEL2 on the held party side, when the hold request addressed to the analog telephone TEL2 is received through the LAN 1, the sound element data type information is extracted from the hold request. The sound element data selector 3f then selectively reads out the corresponding sound element data from the sound element database 3g on the basis of the sound element data type information. The sound source generator 3h generates a hold sound corresponding to the sound element data. The hold sound is then output from the analog telephone I/F 3b to the base station 2 at the destination.

As a result, the hold sound is output from the analog telephone TEL2 of the other party to allow the user to recognize that the telephone TEL1 is on hold.

In example 1-2, as in example 1-1 described above, when a predetermined time has elapsed from the start of a hold period, the generation of the hold sound by the analog telephone TEL2 on the held party side or AT-HUB 32 may be automatically stopped.

As described above, according to the first embodiment of the present invention, the sound element database 3g is installed in the AT-HUB 3. When hold operation or the like is performed between analog telephones TEL1 and TEL2 during voice communication, necessary sound element data is selectively read out from the sound element database 3g in the AT-HUB 31 to which the analog telephone TEL1 on the holding party side, and the sound element data or the type sound element data information addressed to the analog telephone TEL2 on the held party side is sent to the LAN 1. At the AT-HUB 32 on the held party side, a corresponding audible sound is generated on the basis of the received sound element data or the sound element data corresponding to the received sound element data type information and read out from the sound element database 3g, and the corresponding signal is sent to the analog telephone TEL2 on the held part side, thereby outputting the audible sound.

If, therefore, necessary sound element data is registered in the sound element database 3g in advance, this system can generate a hold sound at the analog telephone TEL2 on the held party side without continuously digitizing the hold sound and transmitting the resultant data from the analog telephone TEL1 on the holding party side to the analog telephone TEL2 on the held party side. This decreases the traffic during the hold period, and hence can increase the transmission efficiency of the system accordingly.

In this embodiment, a hold sound is generated from the analog telephone TEL2 as a called device in accordance with hold operation of the analog telephone TEL1. However, the present invention is not limited to the hold sound. For example, the called device may generate a dial tone, ring back tone, warning sound, talkie, or a voice message such as an automatic answer message.

[Second Embodiment]

According to the second embodiment of the multimedia data communication system of the present invention, a sound element database is installed in the ISDN router 6 in the system having the arrangement shown in FIG. 1. In this system, when hold operation or the like is performed on an analog telephone during voice communication, the AT-HUB 3 accommodating the analog telephone or the AT-HUB 3 accommodating the analog telephone of the other party outputs a sound element data acquisition request to the ISDN router 6. With this operation, a hold sound is sent to the analog telephone of the other party on the basis of the acquired sound element data.

Figure 8:
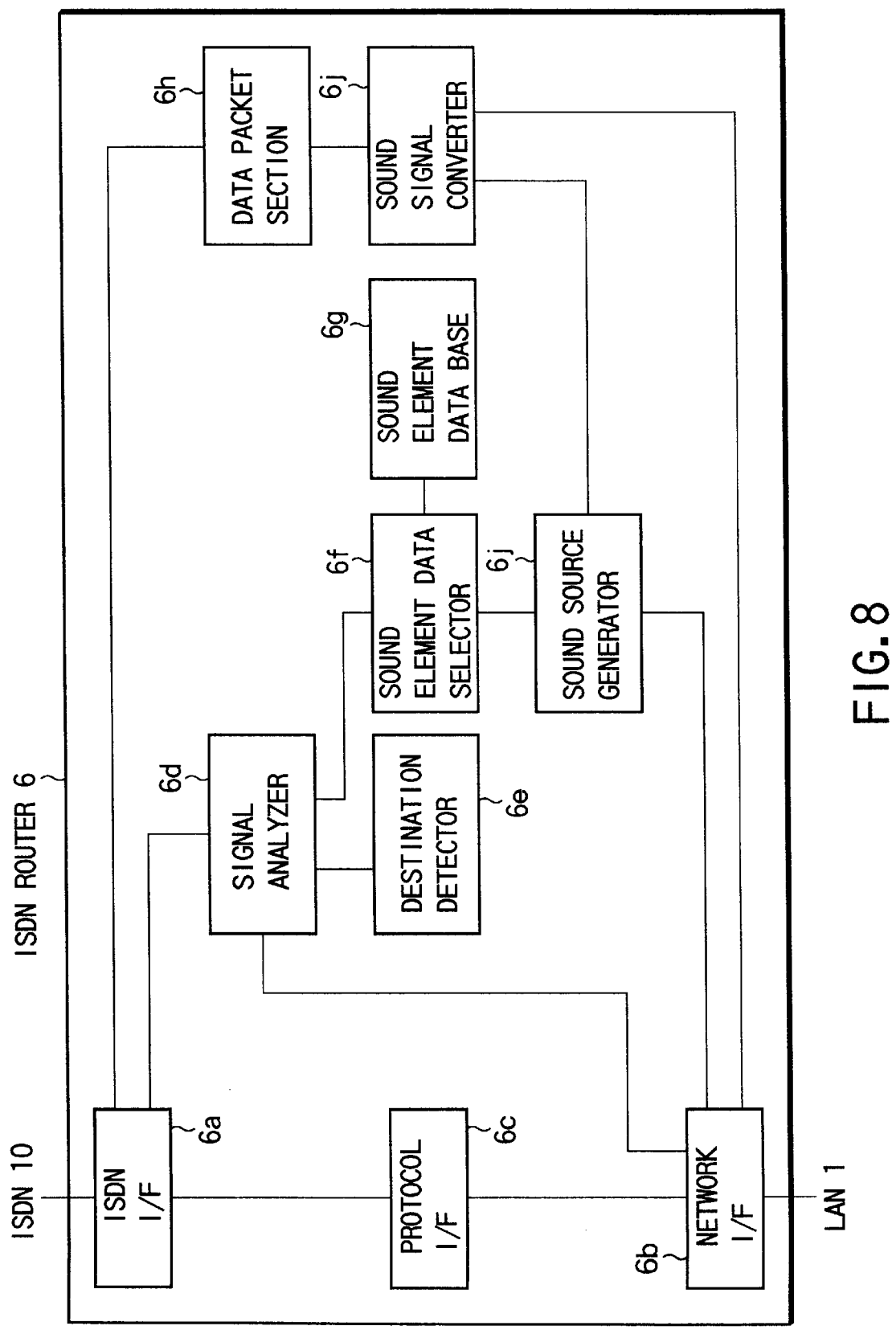
FIG. 8 is a block diagram showing the functional arrangement of an ISDN router in a multimedia data communication system according to the second embodiment of the present invention.

FIG. 8 is a block diagram showing the functional arrangement of an ISDN router 6 of the multimedia data communication system according to the second embodiment. The ISDN router 6 includes an ISDN I/F 6a for interfacing with an ISDN 10, a network I/F 6b for interfacing with a LAN 1, and a protocol I/F 6c. The ISDN router 6 also includes a data packet section 6h and a sound signal converter 6i.

The ISDN I/F 6a controls communication in accordance with the ISDN protocol prescribed between the LAN 1 and the ISDN 10. The network I/F 6b controls data transmission to/from the LAN 1 in accordance with the network protocol prescribed in the LAN 1. The protocol I/F 6c performs protocol conversion between the network protocol and the ISDN protocol. The sound signal converter 6i converts sound data and audible sound data received from the AT-HUB 3 into data in the form suited to packeting. The data packet section 6h generates packets by dividing the sound data and audible data obtained by the sound signal converter 6i into blocks each having a predetermined block length.

The ISDN router 6 includes a signal analyzer 6d and a destination detector 6e. In addition, the ISDN router 6 includes a sound element data selector 6f, a sound element database 6g in which various sound element data required to generate a tone signal like a hold sound and an audible sound like talkie are stored, and a sound element data generator 6j.

Upon reception of signals from the LAN 1 and the ISDN 10, the signal analyzer 6d analyzes the types of signals. For example, the signal analyzer 6d analyzes and determines whether an incoming signal is a general sound packet, request data such as a hold request or reset request, or another control data. The destination detector 6e checks from the destination address contained in the incoming signal whether the destination is the outside line, i.e., the ISDN 10, or the extension, i.e., the LAN 1. If the destination is the extension, the destination detector 6e further determines the communication terminal device of the other party and the AT-HUB to which the communication terminal device is connected.

The sound element data selector 6f determines the type of sound element data in accordance with the type and contents of incoming request data, and selectively reads out the corresponding sound element data from the sound element database 6g. If, for example, request data containing a sound element data type comes from the AT-HUB 3 through the LAN 1, the sound element data selector 6f selects sound element data corresponding to the type.

The arrangement of the sound element database 6g is similar to that of the sound element database 3g in FIG. 3.

Audible sound generating operation of the system having the above arrangement will be described next with reference to the following three examples. Assume that in each example, hold operation is performed on an analog telephone TEL1 accommodated in an AT-HUB 31 during voice communication, and a hold sound is generated from an analog telephone TEL2 of the other party which is accommodated in an AT-HUB 32.

EXAMPLE 2-1

Figure 9:
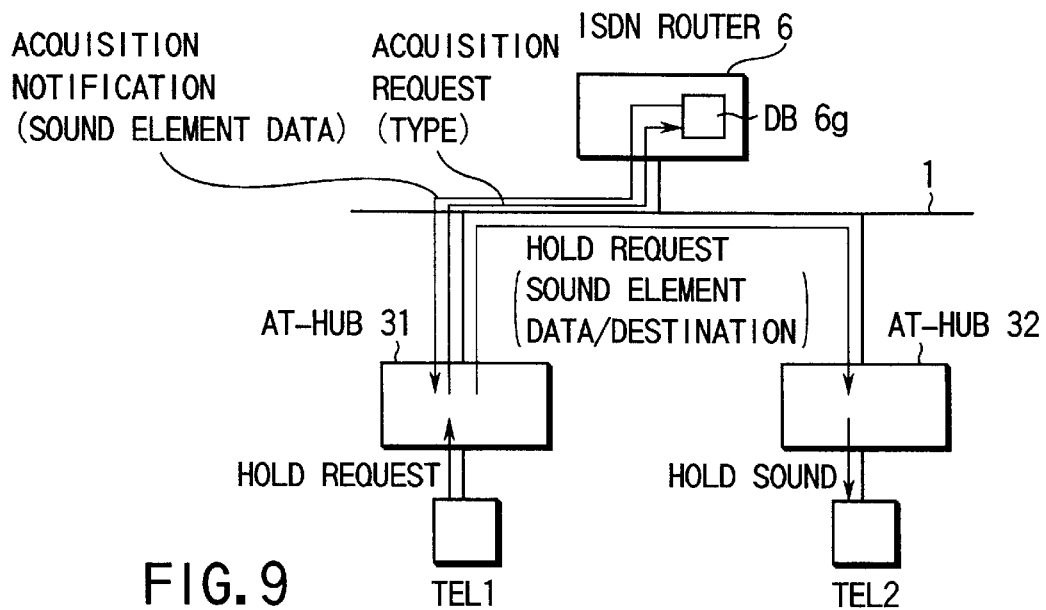
FIG. 9 is a view showing a signal transfer route to explain audible sound generating operation in the first example of the second embodiment.
Figure 10:
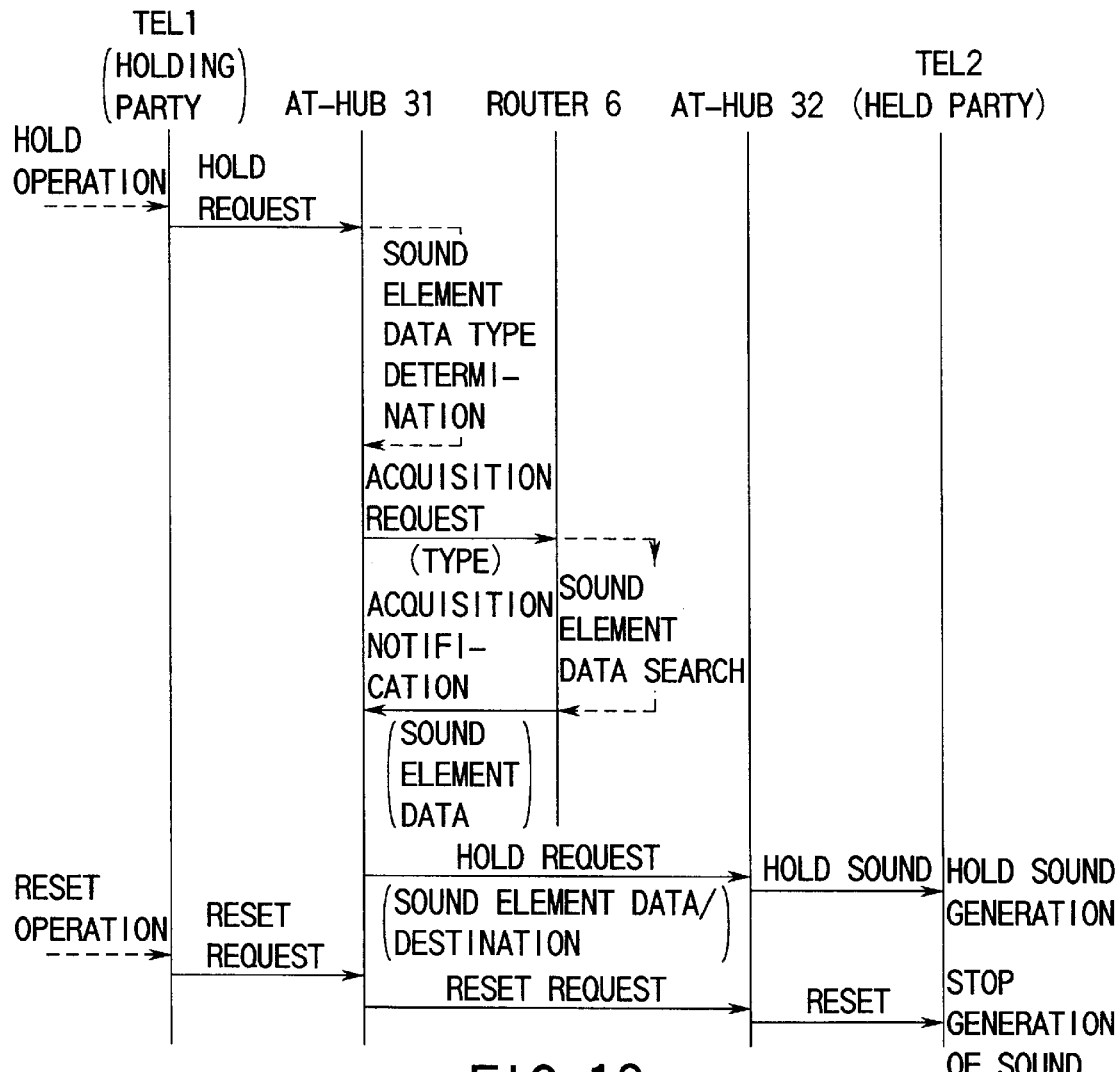
FIG. 10 is a sequence chart for explaining audible sound generating operation in the first example of the second embodiment.

As shown in FIGS. 9 and 10, when the analog telephone TEL1 performs hold operation while communicating with the analog telephone TEL2, a hold request is output from the analog telephone TEL1. Upon reception of the hold request, the signal analyzer 3d in the AT-HUB 31 determines that the request is a hold request, and the sound element data selector 3f determines the type of sound element data for a hold sound on the basis of the determination result. Then, a sound element data acquisition request in which the sound element data type is inserted is generated and sent from the network I/F 3a to the ISDN router 6.

Upon reception of the sound element data acquisition request through the LAN 1, the signal analyzer 6d in the ISDN router 6 extracts the sound element data type information from the acquisition request. The sound element data selector 6f searches the sound element database 6g on the basis of the sound element data type information. As a result, the corresponding sound element data is selectively read out. The sound element data is inserted in an acquisition notification. The notification is packeted and output from the network I/F 6b to the LAN 1 to be sent to the AT-HUB 31 as the source for the acquisition request to which the analog telephone TEL1 on the holding party side is connected.

In the AT-HUB 31, when the sound element data acquisition notification is received from the ISDN router 6 after the acquisition request is sent, the sound element data is extracted from the acquisition notification, and a hold request in which the sound element data and destination information are inserted is generated. The sound element data generator 6j outputs the hold request from the network I/F 6b to the LAN 1 to send it to the analog telephone TEL2 on the held party side.

In the AT-HUB 32 accommodating the analog telephone TEL2 on the held party side, when the hold request addressed to the analog telephone TEL2 connected to the AT-HUB 32 is received through the LAN 1, the sound element data is extracted from the hold request, and a hold sound is generated from the sound source generator 3h. The hold sound is supplied from the analog telephone I/F 3b to the analog telephone TEL2 as the destination.

As a result, the hold sound is output from the analog telephone TEL2 of the other party to allow the user of the analog telephone TEL2 to recognize that the analog telephone TEL1 is on hold.

When reset operation is performed on the analog telephone TEL1 on the holding party side, a reset request is output from the analog telephone TEL1. In the AT-HUB 31, reset request data corresponding to the reset request is generated and output from the network I/F 3a to the LAN 1 to be sent to the analog telephone TEL2 as the other party.

In the AT-HUB 32 accommodating the analog telephone TEL2 on the held party side, when the reset request data addressed to the analog telephone TEL2 accommodated in the AT-HUB 32 is received through the LAN 1, the hold sound generating operation of the sound source setting section 3h is stopped. As a result, the hold sound output from the analog telephone TEL2 on the held party side is stopped. Thereafter, the voice communication between the analog telephones TEL1 and TEL2 is resumed.

In example 2-1, as in example 1-1 described above, when a predetermined time has elapsed from the start of a hold period, the generation of the hold sound by the analog telephone TEL2 on the held party side or AT-HUB 32 may be automatically stopped.

EXAMPLE 2-2

Figure 11:
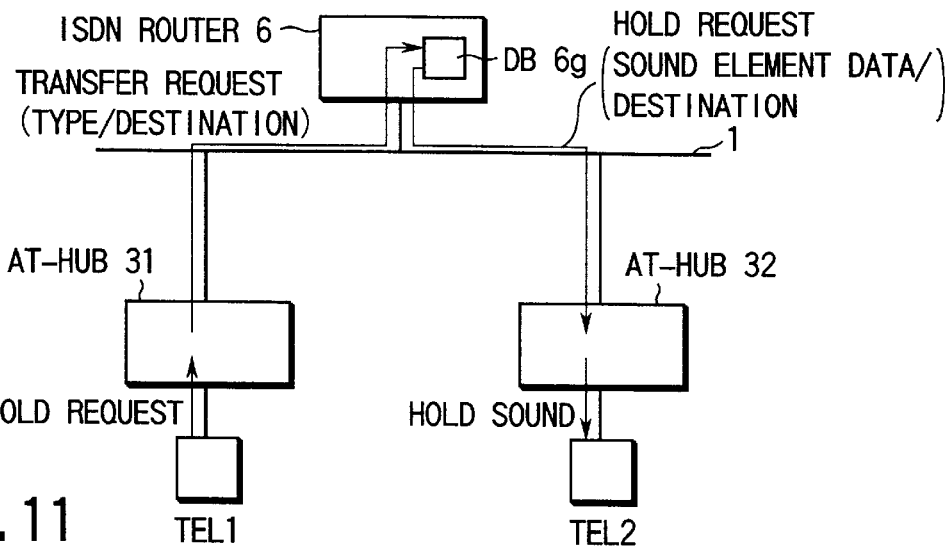
FIG. 11 is a view showing a signal transfer route to explain audible sound generating operation in the second example of the second embodiment.
Figure 12:
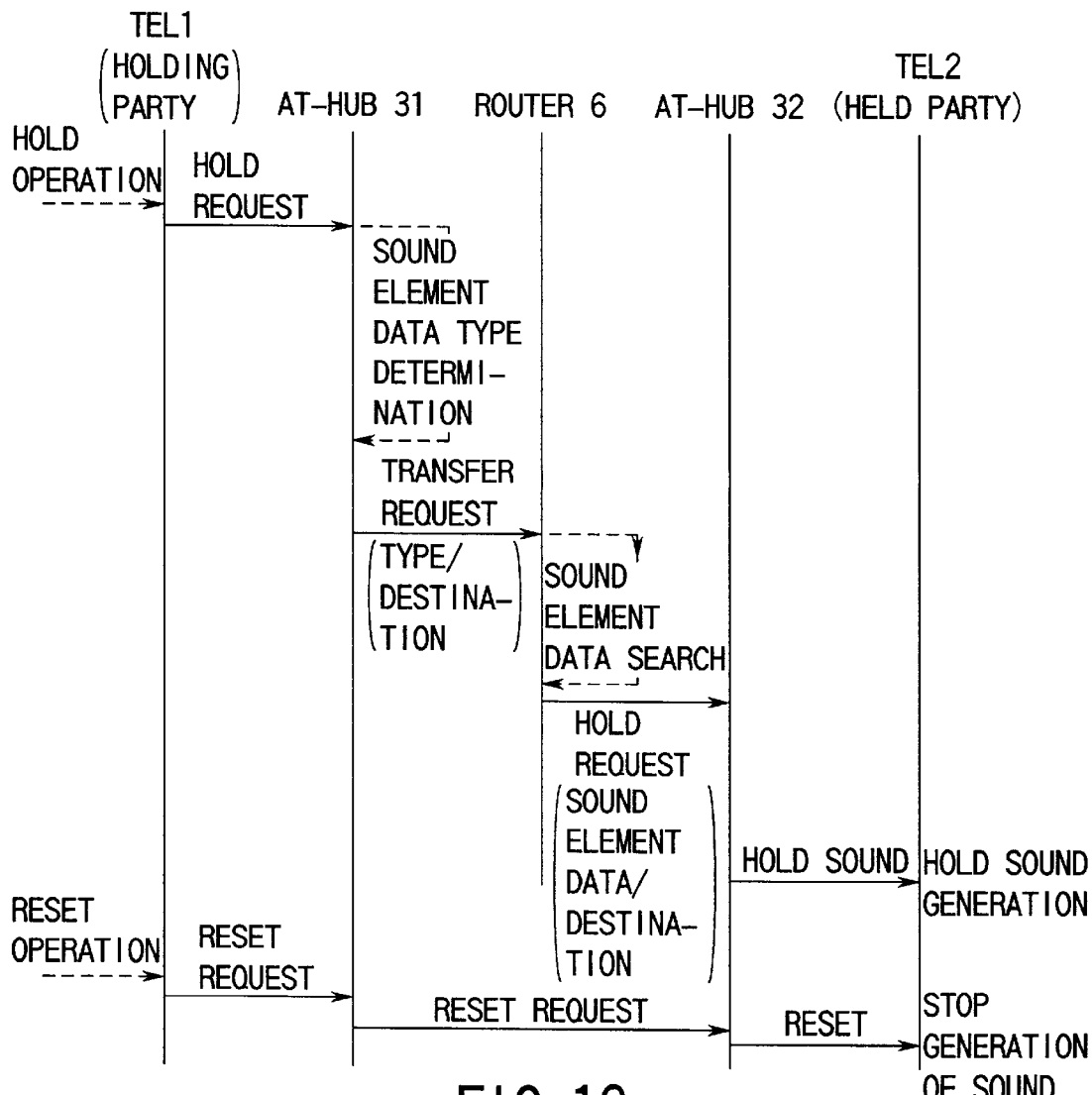
FIG. 12 is a sequence chart for explaining audible sound generating operation in the second example of the second embodiment.

When hold operation is performed on the analog telephone TEL1 during voice communication, a hold request is output from the analog telephone TEL1, as shown in FIGS. 11 and 12. Upon reception of the hold request, the signal analyzer 3d in the AT-HUB 31 determines that the request is a hold request, and the sound element data selector 3f determines the type of sound element data for a hold sound on the basis of the determination result. A sound element data transfer request in which the sound element data type information and the destination information of the analog telephone TEL2 as the other party on the held party side are inserted is generated. The sound element data transfer request is packeted and output from the network I/F 3a to the LAN 1 to be sent to the ISDN router 6.

Upon reception of the sound element data transfer request through the LAN 1, the signal analyzer 6d in the ISDN router 6 extracts the sound element data type information from the transfer request. The sound element data selector 6f then searches the sound element database 6g on the basis of the sound element data type information. As a result, the corresponding sound element data is selectively read out. The sound element data is inserted in transfer notification data together with the destination information of the analog telephone TEL2 on the held party side, and the transfer notification data is packeted. This packet is output from the network I/F 6b to the LAN 1 to be sent to the analog telephone TEL2 on the held party side.

In the AT-HUB 32 accommodating the analog telephone TEL2 on the held part side, when the transfer notification data addressed to the analog telephone TEL2 connected to the AT-HUB 32 is received through the LAN 1, the sound element data is extracted from the transfer notification data. On the basis of the extracted sound element data type information, the sound element data selector 3f then selectively reads out the corresponding sound element data from the sound element database 3g. The sound source generator 3h generates a hold sound corresponding to the sound element data. The hold sound is supplied from the analog telephone I/F 3b to the analog telephone TEL2 as the destination.

As a result, the hold sound is output from the analog telephone TEL2 as the other party to allow the user to recognize that the telephone is on hold.

In example 2-2, as in example 2-1 described above, when a predetermined time has elapsed from the start of a hold period, the generation of the hold sound by the analog telephone TEL2 on the held party side or AT-HUB 32 may be automatically stopped.

EXAMPLE 2-3

Figure 13:
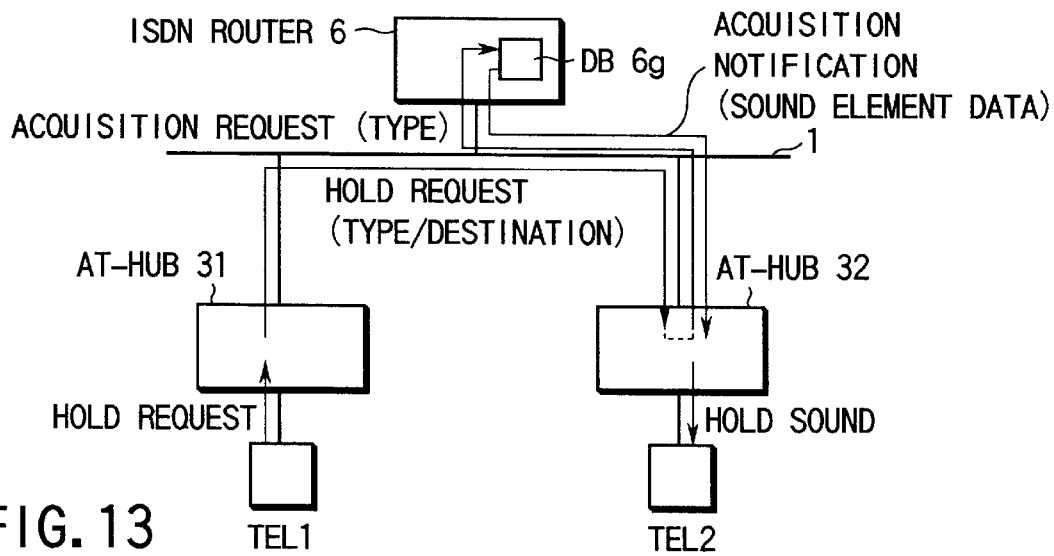
FIG. 13 is a view showing a signal transfer route to explain audible sound generating operation in the third example of the second embodiment.
Figure 14:
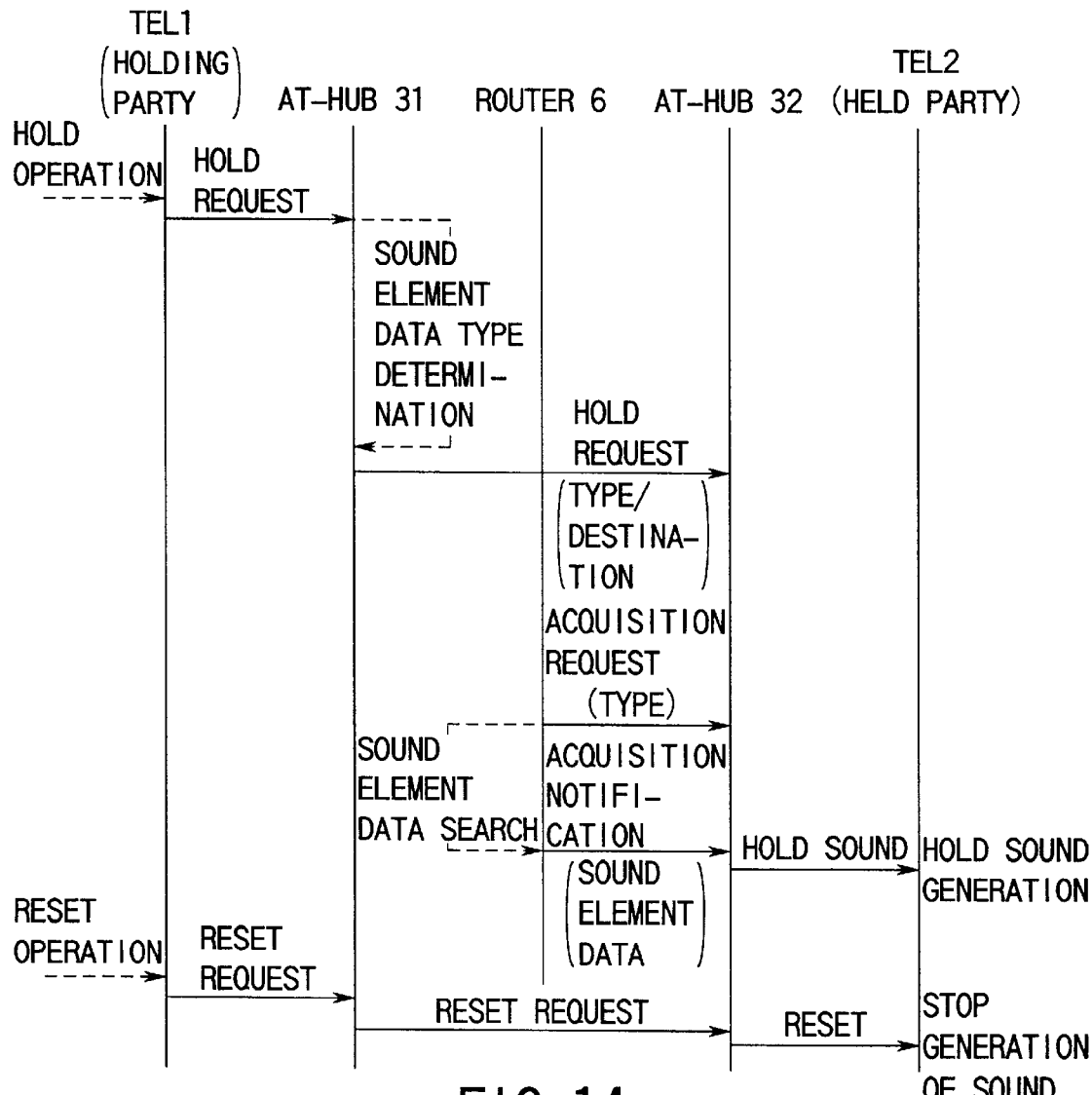
FIG. 14 is a sequence chart for explaining audible sound generating operation in the third example of the second embodiment.

When hold operation is performed on the analog telephone TEL1 during voice communication, a hold request is output from the analog telephone TEL1, as shown in FIGS. 13 and 14. Upon reception of the hold request, the signal analyzer 3d in the AT-HUB 31 determines that the request is a hold request, and the sound element data selector 3f determines the type of sound element data for a hold sound on the basis of the determination result. A hold request in which the determined sound element data type and the destination information of the analog telephone TEL2 on the held party side are inserted is generated. The hold request is output from the network I/F 3a to the LAN 1 to be sent to the analog telephone TEL2 on the held party side.

In the AT-HUB 32 accommodating the analog telephone TEL2 on the held party side, when the hold request addressed to the analog telephone TEL2 is received, the sound element data type is extracted from the hold request, and a sound element data acquisition request in which the sound element data type information is inserted is generated. The sound element data acquisition request is output from the network I/F 3a to the LAN 1 to be sent to the ISDN router 6.

Upon reception of the sound element data acquisition request through the LAN 1, the signal analyzer 6d in the ISDN router 6 extracts the sound element data type information from the sound element data acquisition request. The sound element data selector 6f searches the sound element database 6g on the basis of the sound element data type information. With this operation, the corresponding sound element data is selectively read out. The sound element data is inserted in an acquisition notification. This notification is output from the network I/F 6b to the LAN 1 to be sent to the AT-HUB 32 as the acquisition request source.

In the AT-HUB 32 accommodating the analog telephone TEL2 on the held party side, when the acquisition notification addressed to the analog telephone TEL2 accommodated in the AT-HUB 32 is received from the ISDN router 6 through the LAN 1 after the sound element data acquisition request is sent, the sound element data is extracted from the acquisition notification, and a hold sound is generated from the sound source generator 3h on the basis of the sound element data. The hold sound is supplied from the analog telephone I/F 3b to the analog telephone TEL2 as the destination.

With this operation, the hold sound is output from the analog telephone TEL2 as the other party to allow the user to recognize that the telephone TEL1 is on hold.

In third example 2-3, as in first and second examples 2-1 and 2-2 described above, when a predetermined time has elapsed from the start of a hold period, the generation of the hold sound by the analog telephone TEL2 on the held party side or AT-HUB 32 may be automatically stopped.

As described above, according to the second embodiment of the present invention, the sound element database 6g is installed in the ISDN router 6. Upon reception of a sound element data acquisition request from the AT-HUB 31 or 32 on the holding or held party side, the ISDN router 6 searches the sound element database 6g for the sound element data corresponding to the acquisition request, and sends the acquired data to the AT-HUB 31 or 32 as the request source. When a sound element data transfer request is received from the AT-HUB 31 on the holding party side, the corresponding sound element data is sent to the AT-HUB 32 on the held party side. In the AT-HUB 32 on the held party side, a hold sound is generated on the basis of the sound element data sent from the ISDN router 6. The hold sound is supplied to the analog telephone TEL2 on the held party side to be generated.

According to the second embodiment, it suffices if the sound element database 6g, the function of searching the database, and the function of transmitting data are arranged in only the ISDN router 6. With this arrangement, the system configuration and sound element data management can be simplified as compared with the first embodiment in which the sound element database 6g and the like are arranged in each of the terminal interface devices such as the AT-HUBs 31 and 32.

[Third Embodiment]

According to the third embodiment of the multimedia data communication system of the present invention, a sound element database is installed in a communication server 8 in the system having the arrangement shown in FIG. 1. When hold operation or the like is performed on an analog telephone during voice communication, a sound element data acquisition request is output from an AT-HUB 3 accommodating the analog telephone or an AT-HUB 3 accommodating the analog telephone as the other party to the communication server 8. A hold sound is then sent to the analog telephone as the other party on the basis of the sound element data acquired in this manner.

Figure 15:
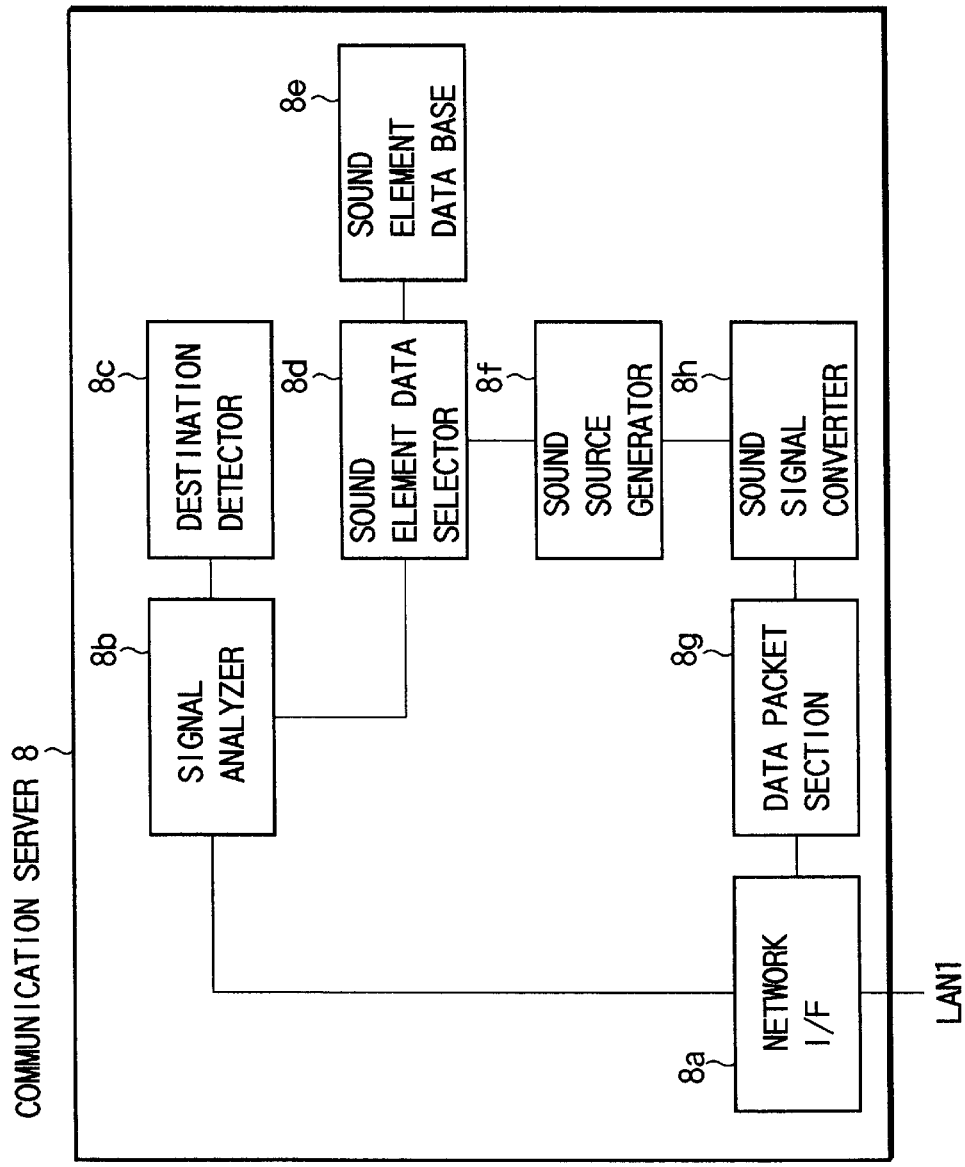
FIG. 15 is a block diagram showing the functional arrangement of a communication server in a multimedia data communication system according to the third embodiment of the present invention.

FIG. 15 is a block diagram showing the functional arrangement of the communication server 8 of the multimedia data communication system according to the third embodiment.

The communication server 8 includes a network I/F 8a for interfacing with a LAN 1, a signal analyzer 8b, and a destination detector 8c. The communication server 8 also includes a sound element data selector 8d, a sound element database 8e, a sound element generator 8f, a data packet section 8g, and a sound signal converter 8h.

The network I/F 8a controls data transmission to/from the LAN 1 in accordance with the network protocol prescribed in the LAN 1. Upon reception of a signal from the LAN 1, the signal analyzer 8b analyzes the type of signal. For example, the signal analyzer 8b analyzes and determines whether an incoming signal is a general sound packet, request data like a hold request or reset request, or another control data. The destination detector 8c checks on the basis of the destination address contained in the incoming signal whether the signal is addressed to the communication server 8.

Various sound element data required to generate a tone signal like a hold sound and an audible sound like talkie are stored. The sound element database 8e has the same arrangement as that of the sound element database 3g shown in FIG. 3.

Upon reception of request data containing a sound element data type from the AT-HUB 3 through the LAN 1, the sound element data selector 8d determines the sound element data type contained in the request data, and selectively reads out the corresponding sound element data from the sound element database 8e.

The sound element generator 8f generates transmission data used to send the sound element data read out from the sound element database 8e by the sound element data selector 8d. The data packet section Bg forms the transmission data in which the sound element data is inserted into a packet. The packet is sent from the network I/F Ba to the LAN 1.

The audible sound generating operation of the system having the above arrangement will be described with reference to the following three examples as in the case with the second embodiment.

Assume that in this embodiment as well, hold operation is performed on an analog telephone TEL1 accommodated in an AT-HUB 31 during voice communication, and a hold sound is generated from an telephone TEL2 as the other party which is accommodated in an AT-HUB 32.

EXAMPLE 3-1

Figure 16:
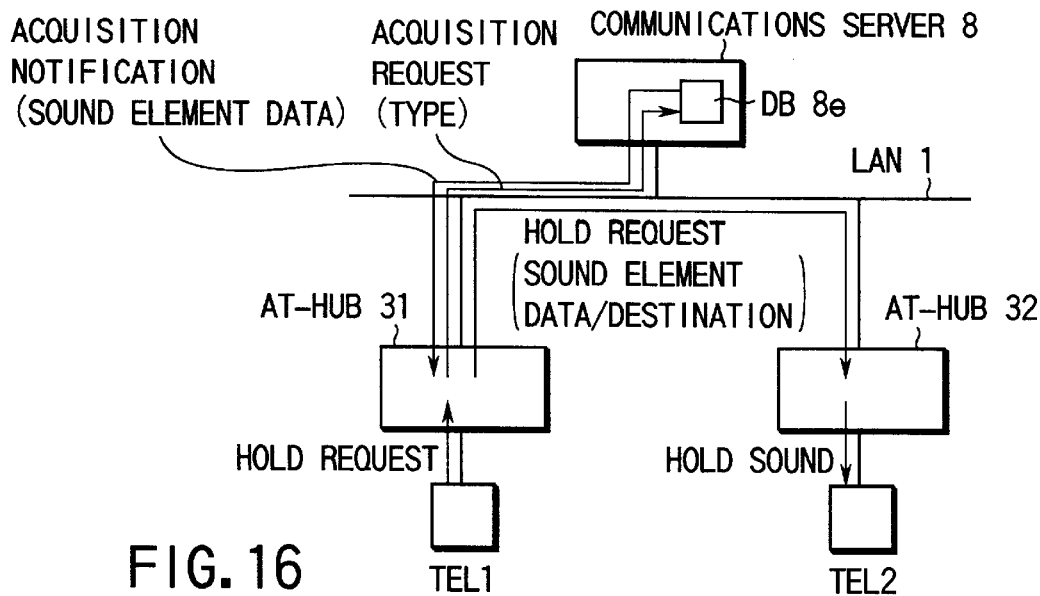
FIG. 16 is a view showing a signal transfer route to explain audible sound generating operation in the first example of the third embodiment.
Figure 17:
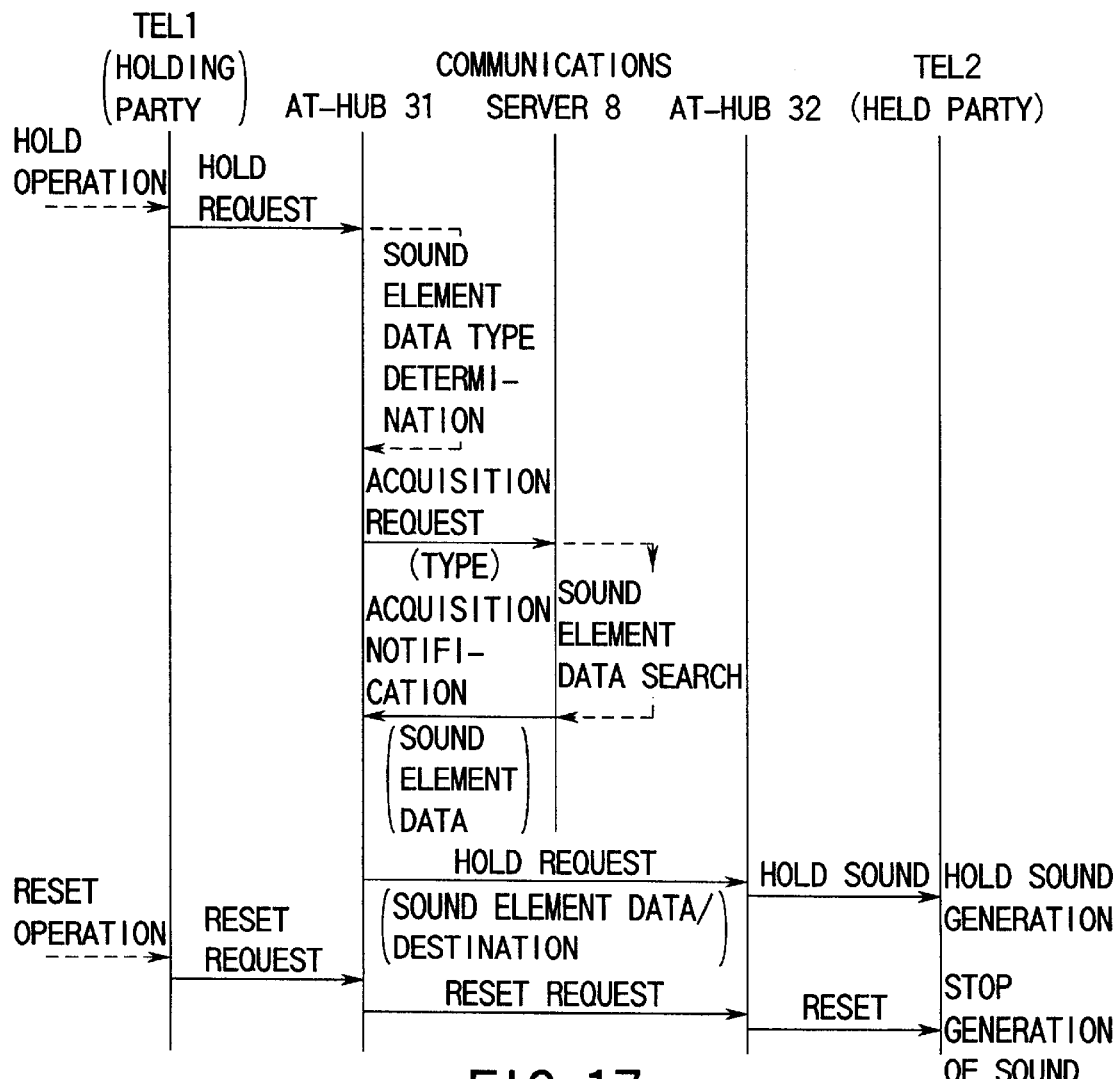
FIG. 17 is a sequence chart for explaining audible sound generating operation in the first example of the third embodiment.

When hold operation is performed on the analog telephone TEL1 during voice communication, a hold request is output from the analog telephone TEL1, as shown in FIGS. 16 and 17. Upon reception of the hold request, a signal analyzer 3d in the AT-HUB 31 determines that the request is a hold request, and a sound element data selector 3f determines the type of sound element data for a hold sound on the basis of the determination result. A sound element data acquisition request in which the sound element data type is inserted is generated. This acquisition request is sent from a network I/F 3a to the communication server 8.

Upon reception of the sound element data acquisition request through the LAN 1, the signal analyzer 8b in the communication server 8 extracts the sound element data type information from the acquisition request. The sound element data selector 8d searches the sound element database 8e on the basis of the sound element data type information, and selectively reads out the corresponding sound element data. The sound data is then inserted in an acquisition notification. This notification is packeted and output from the network I/F 8a to the LAN 1 to be sent to the AT-HUB 31 as the acquisition request source.

In the AT-HUB 31 on the holding party side, when the acquisition notification is received from the communication server 8 after the sound element data acquisition request is sent, the sound element data is extracted from the acquisition notification, and a hold request in which the sound element data and destination information are inserted is generated. A sound element data generator 6j outputs the hold request from the network I/F 8a to the LAN 1 to send it to the analog telephone TEL2 on the held party side.

In the AT-HUB 32 accommodating the analog telephone TEL2 of the other party, when the hold request addressed to the analog telephone TEL2 accommodated in the AT-HUB 32 is received through the LAN 1, the sound element data is extracted from the hold request, and a hold sound is generated from a sound source generator 3h on the basis of the sound element data. The hold sound is supplied from an analog telephone I/F 3b to the analog telephone TEL2 as the destination.

With this operation, the hold sound is output from the analog telephone TEL2 of the other party to allow the user to recognize that the telephone is on hold.

When reset operation is performed on the analog telephone TEL1 on the holding party side, a reset request is output from the analog telephone TEL1. As a result, in the AT-HUB 31, request data corresponding to the reset request is generated and output from the network I/F 3a to the LAN 1 to be sent to the analog telephone TEL2 of the other party.

In the AT-HUB 32 to which the analog telephone TEL2 on the held party side is connected, when the reset request data addressed to the analog telephone TEL2 connected to the AT-HUB 32 is received through the LAN 1, the hold sound generating operation of the sound source generator 3h is stopped. The hold sound having been output from the analog telephone TEL2 on the held party side is stopped. Subsequently, the voice communication between the analog telephones TEL1 and TEL2 is resumed.

In this example, as in the examples of the first and second embodiments described above, when a predetermined time has elapsed from the start of a hold period, the generation of the hold sound by the analog telephone TEL2 on the held party side or AT-HUB 32 may be automatically stopped.

EXAMPLE 3-2

Figure 18:
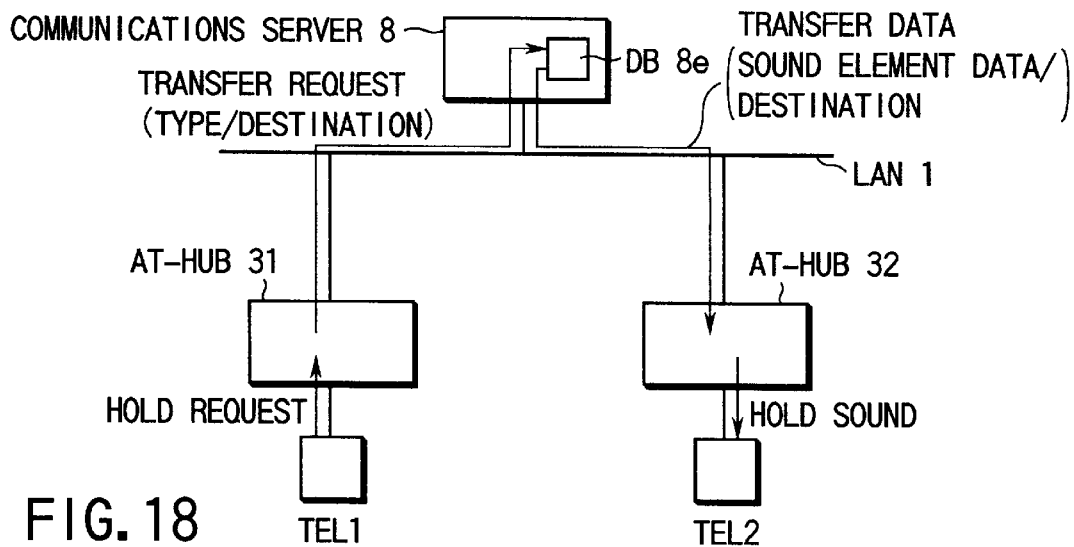
FIG. 18 is a view showing a signal transfer route to explain audible sound generating operation in the second example of the third embodiment.
Figure 19:
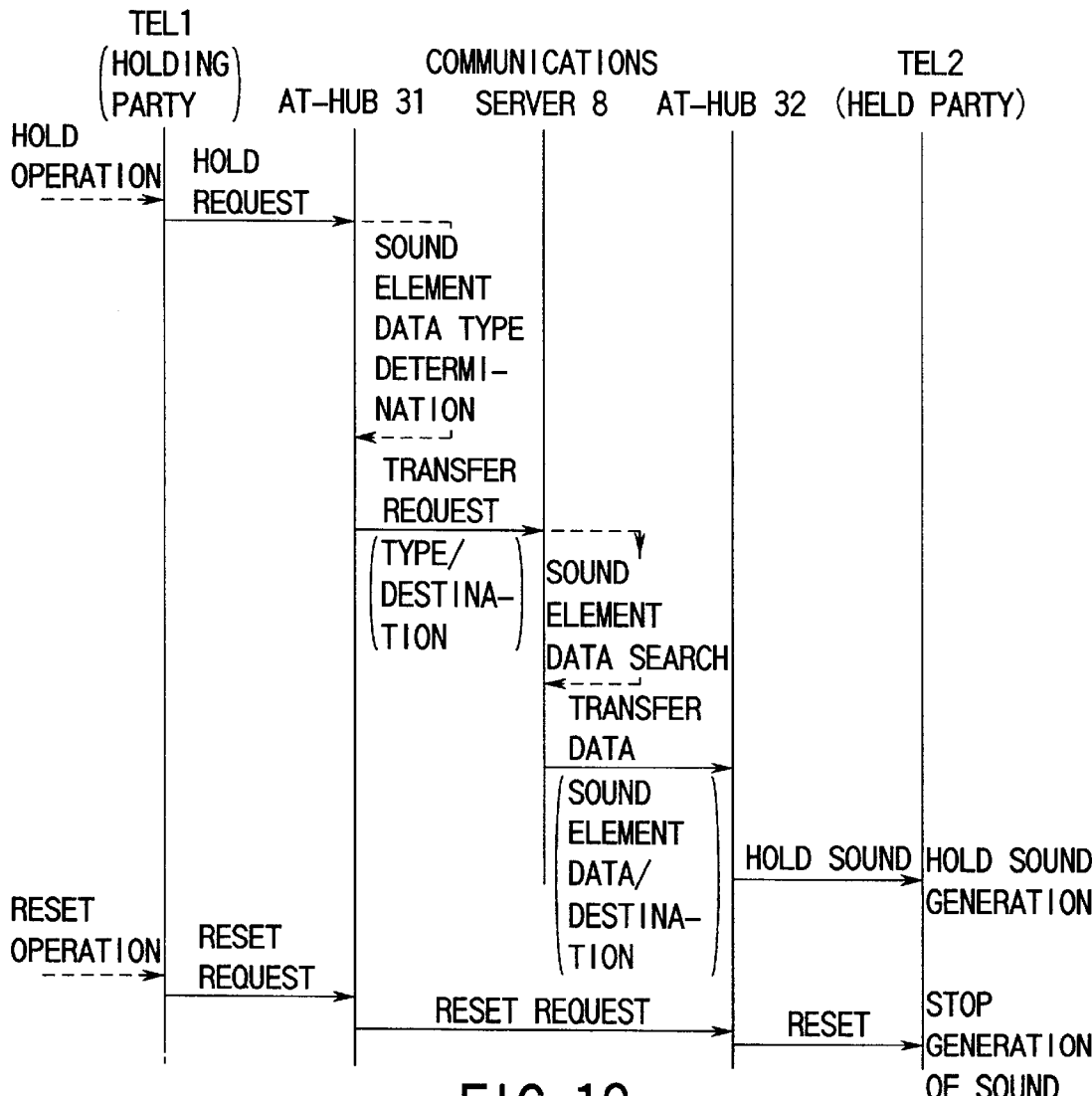
FIG. 19 is a sequence chart for explaining audible sound generating operation in the second example of the third embodiment.

When hold operation is performed on the analog telephone TEL1 during voice communication, a hold request is output from the analog telephone TEL1, as shown in FIGS. 18 and 19. Upon reception of the hold request, the signal analyzer 3d in the AT-HUB 31 determines that the request is a hold request, and the sound element data selector 3f determines the type of sound element data for a hold sound on the basis of the determination result. A sound element data transfer request in which the sound element data type information and the destination information of the analog telephone TEL2 of the other party on the held party side are inserted is generated. The sound element data transfer request is output from the network I/F 3a to the LAN 1 to be sent to the communication server 8.

Upon reception of the sound element data transfer request through the LAN 1, the signal analyzer 8b in the communication server 8 extracts the sound element data type information from the transfer request. The sound element data selector 8d then searches the sound element database 8e on the basis of the sound element data type information to selectively read out the corresponding sound element data. The sound element data is inserted in transfer notification data together with the destination information of the analog telephone TEL2 on the held party side. The transfer notification data is packeted and output from the network I/F 8*a* to the LAN 1 to be sent to the analog telephone TEL2 on the held party side.

In the AT-HUB 32 accommodating the analog telephone TEL2 on the held party side, when the transfer notification data addressed to the analog telephone TEL2 connected to the AT-HUB 32 is received through the LAN 1, the sound element data is extracted from the transfer notification data. The sound source generator 3*h* then generates a hold sound corresponding to the extracted sound element data, and supplies it from the analog telephone I/F 3*b* to the analog telephone TEL2 as the destination.

With this operation, the hold sound is output from the analog telephone TEL2 of the other party to allow the user to recognize that the telephone TEL1 is on hold.

In second example 3-2, as in example 3-1 described above, when a predetermined time has elapsed from the start of a hold period, the generation of the hold sound by the analog telephone TEL2 on the held party side or AT-HUB 32 may be automatically stopped.

EXAMPLE 3-3

Figure 20:
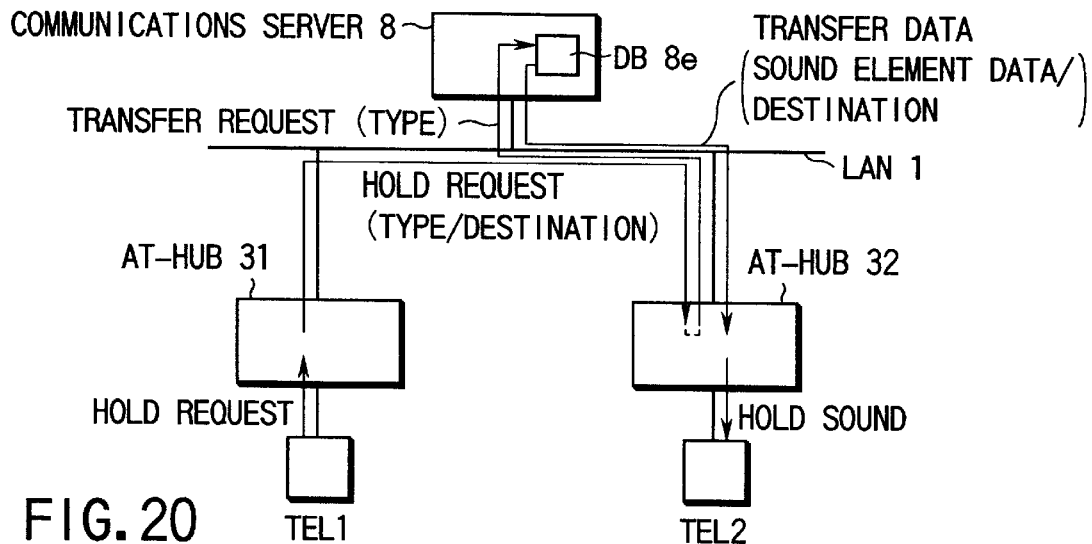
FIG. 20 is a view showing a signal transfer route to explain audible sound generating operation in the third example of the third embodiment.
Figure 21:
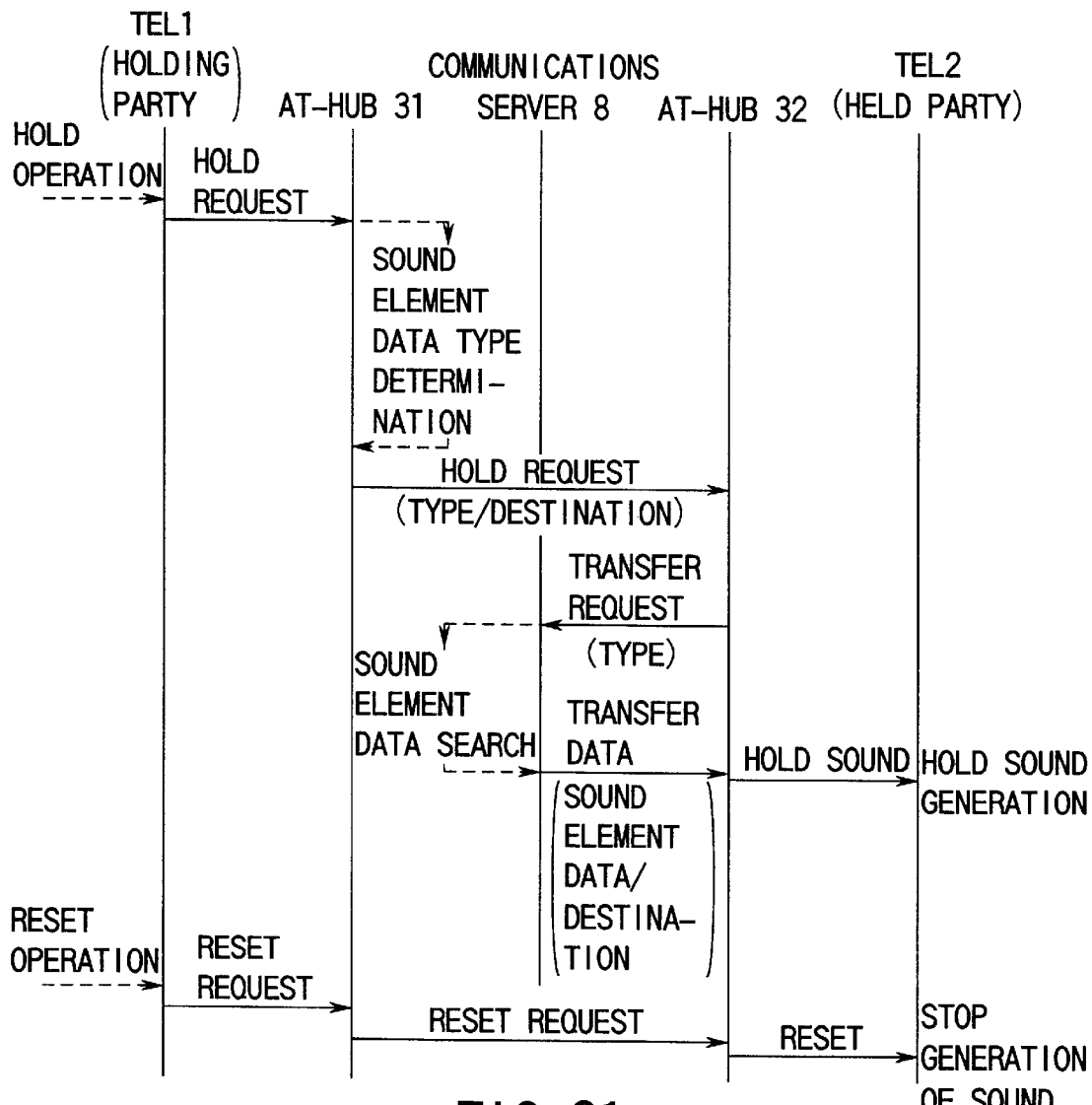
FIG. 21 is a sequence chart for explaining audible sound generating operation in the third example of the third embodiment.

When hold operation is performed on the analog telephone TEL1 during voice communication, a hold request is output from the analog telephone TEL1, as shown in FIGS. 20 and 21. Upon reception of the hold request, the signal analyzer 3*d* in the AT-HUB 31 determines that the request is a hold request, and the sound element data selector 3*f* determines the type of sound element data for a hold sound on the basis of the determination result. A hold request in which the sound element data type and the destination information of the analog telephone TEL2 on the held party side are inserted is generated. The hold request is then output from the network I/F 3*a* to the LAN 1 to be sent to the analog telephone TEL2 on the held party side.

In the AT-HUB 32 accommodating the analog telephone TEL2 on the held party side, when the hold request addressed to the analog telephone TEL2 is received, the sound element data type is extracted from the hold request and is inserted in a sound element data transfer request. The sound element data transfer request is output from the network I/F 3*a* to the LAN 1 to be sent to the communication server 8.

Upon reception of the sound element data transfer request through the LAN 1, the signal analyzer 8*b* in the communication server 8 extracts the sound element data type information from the transfer request. The sound element data selector 8*d* searches the sound element database 8*e* on the basis of the sound element data type information and selectively reads out the corresponding sound element data. The sound element data is inserted in transfer data and packeted. The packet is then output from the network I/F Ba to the LAN 1 to be sent to the AT-HUB 32 as the transfer request source.

In the AT-HUB 32 accommodating the analog telephone TEL2 on the held party side, when the transfer data addressed to the analog telephone TEL2 accommodated in the AT-HUB 32 is received from the communication server 8 through the LAN 1 after the sound element data transfer request is sent, the sound element data is extracted from the transfer data. The sound source generator 3*h* generates a hold sound on the basis of the sound element data. The hold sound is supplied from the analog telephone I/F 3*b* to the analog telephone TEL2 as the destination.

As a result, the hold sound is output from the analog telephone TEL2 as the other party to allow the user to recognize that the telephone TEL1 is on hold.

In third second example 3-3, as in first and second examples 3-1 and 3-2 described above, when a predetermined time has elapsed from the start of a hold period, the generation of the hold sound by the analog telephone TEL2 on the held party side or AT-HUB 32 may be automatically stopped.

As described above, in the third embodiment of the present invention, the sound element database 8*e* is installed in the communication server 8. Upon reception of an acquisition request from the AT-HUB 31 or 32 on the holding party side or held party side, the communication server 8 searches the sound element database 8*e* for sound element data corresponding to this request and notifies the AT-HUB 31 or 32 as the request source of the sound element data. Upon reception of a sound element data transfer request from the AT-HUB 31 on the holding party side, the communication server 8 sends the corresponding sound element data to the AT-HUB 32 on the held party side. In the AT-HUB 32 on the held party side, a hold sound is generated on the basis of the sound element data sent from the communication server 8, and the hold sound is supplied to the analog telephone TEL2 on the held party side to be generated.

According to the this embodiment, it suffices if the sound element database 8*e*, the function of searching the database, and the function of transmitting data are arranged in only the communication server 8. With this arrangement, the system configuration and sound element data management can be simplified as compared with the first embodiment in which the sound element database 8*e* and the like are arranged in each of the terminal interface devices such as the AT-HUBs 31 and 32.

If such functions are installed in an ISDN router 6 as in the second embodiment, it is expected that essential processing such as call routing processing to be performed by the ISDN router 6 will be delayed owing to a search for sound element data or transfer notification processing for the data. If, however, the sound element data search function and transfer notification processing function are installed in the communication server 8 as in the third embodiment, the processing load on the ISDN router 6, like that described above, can be reduced, thereby providing a system that suffers little delay in processing even in a high traffic state.

[Fourth Embodiment]

In the first to third embodiments, sound element data are continuously sent from the sound element database to the AT-HUB 32 on the held party side. This may increase the load on the network. An embodiment designed to prevent an increase in load on the network due to the generation of an audible sound will be described below.

Figure 22:
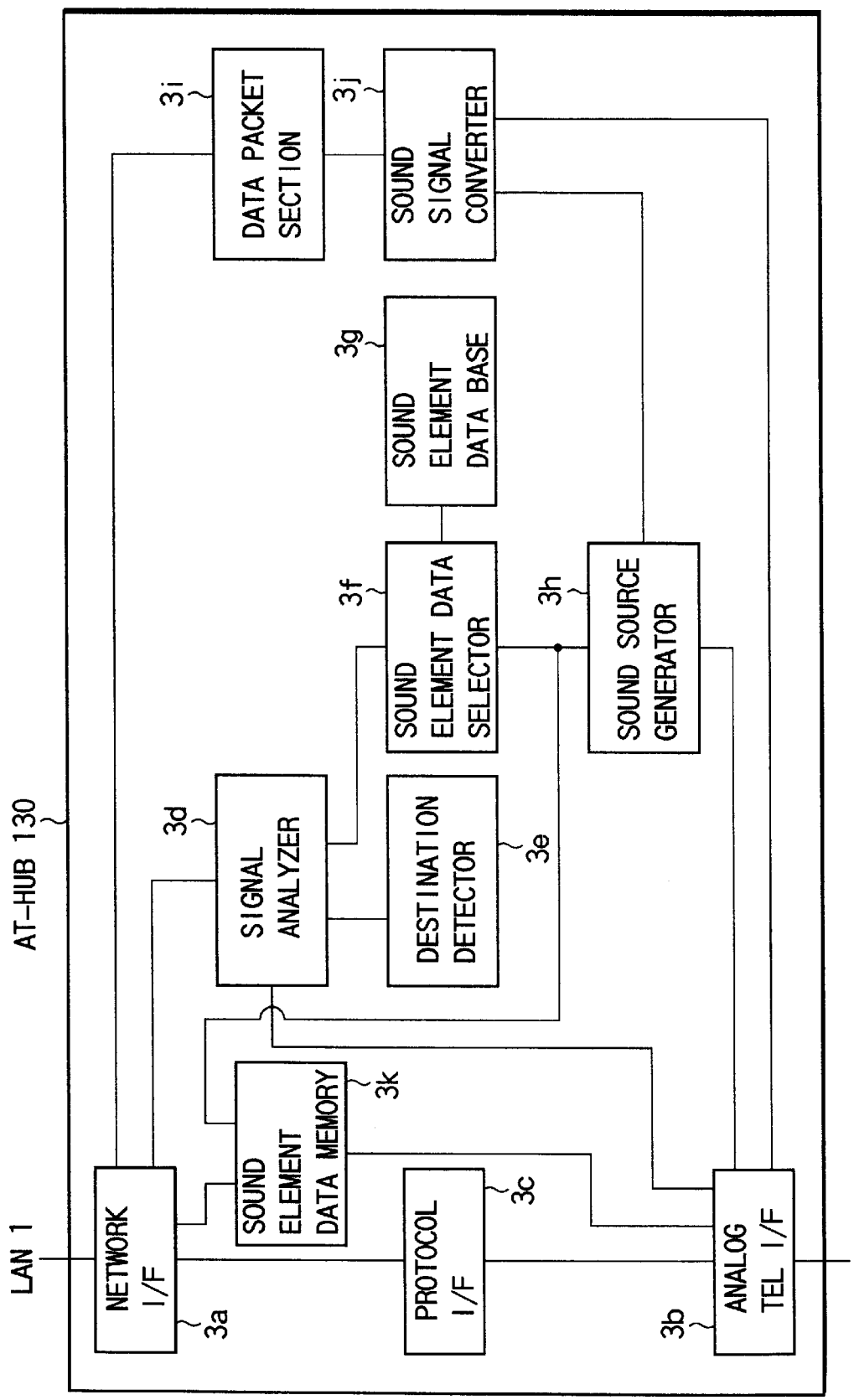
FIG. 22 is a block diagram showing the functional arrangement of an analog telephone hub in a multimedia data communication system according to the fourth embodiment of the present invention.

The fourth embodiment is a modification of the first embodiment. In the fourth embodiment, a sound element database is installed in an analog telephone hub. Although the overall arrangement of the fourth embodiment is the same as that of the first embodiment shown in FIG. 1, the arrangement of the analog telephone hub differs from that in the first embodiment. More specifically, in addition to the arrangement of the first embodiment, as shown in FIG. 22, an AT-HUB 130 includes a sound element data memory 3*k* for storing sound element data supplied from a LAN 1, which is arranged between a network I/F 3*a* and an analog telephone I/F 3*b*.

The audible sound generating operation of the system having the above arrangement will be described next with reference to the following two examples. Assume that in each example, hold operation is performed on an analog telephone TEL1 accommodated in an AT-HUB 131 during voice communication, and a hold sound is generated from an telephone TEL2 of the other party which is accommodated in an AT-HUB 132.

EXAMPLE 4-1

Figure 23:
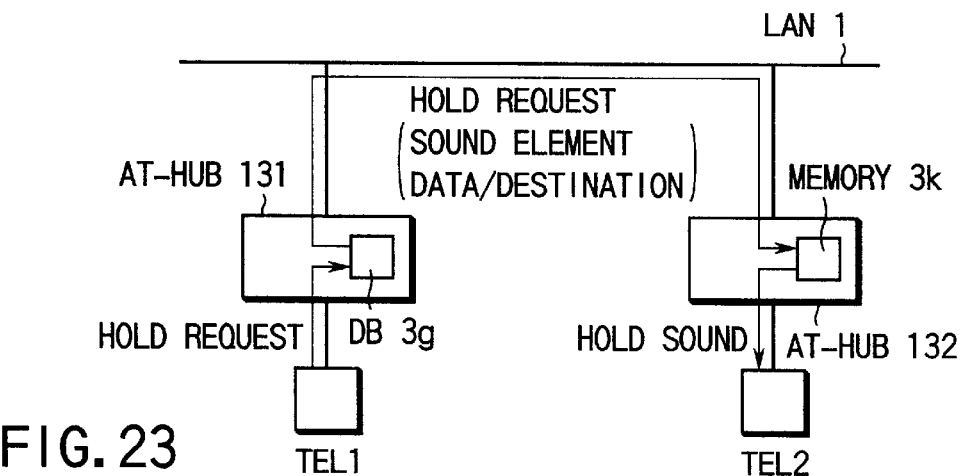
FIG. 23 is a view showing a signal transfer route to explain audible sound generating operation in the first example of the fourth embodiment.

As shown in FIG. 23, when the analog telephone TEL1 performs hold operation during voice communication with the analog telephone TEL2, a hold request is output. Upon reception of the hold request, a signal analyzer 3d in the AT-HUB 131 determines that the request is a hold request. A sound element data selector 3f determines the type of sound element data for the hold sound on the basis of the determination result, and selectively reads out the corresponding sound element data from a sound element database 3g. This sound element data is used to generate a periodic audible sound of one cycle. The hold request in which the sound,element data and the destination information of the analog telephone TEL2 on the held party side are inserted is output from the network I/F 3a to the LAN 1 to be sent to the analog telephone TEL2 of the other party.

In the AT-HUB 132 to which the analog telephone TEL2 of the other party is connected, when the hold request addressed to the analog telephone TEL2 accommodated in the AT-HUB 132 is received through the LAN 1, the sound element data is extracted from the hold request and written in the sound element data memory 3k. When the sound element data is completely written in the sound element data memory 3k, transmission of the hold request from the AT-HUB 131 to the AT-HUB 132 is complete. Thereafter, in the AT-HUB 132 on the held party side, sound element data is repeatedly read out from the sound element data memory 3k, and a hold sound is continuously generated from the sound source generator 3h on the basis of the readout sound element data. The hold sound is sent from the analog telephone I/F 3b to the analog telephone TEL2 on the held party side.

With this operation, the hold sound is continuously output from the analog telephone TEL2 of the other party to allow the user of the analog telephone TEL2 to recognize that the telephone TEL1 is on hold.

When reset operation is performed on the analog telephone TEL1 on the hold party side, a reset request is output from the analog telephone TEL1. As a result, in the AT-HUB 131, request data corresponding to the reset request is generated and output from the network I/F 3a to the LAN 1 to be sent to the analog telephone TEL2 of the other party.

In the AT-HUB 132 to which the analog telephone TEL2 on the held party side, when the reset request data addressed to the analog telephone TEL2 connected to the AT-HUB 132 is received through the LAN 1, the hold sound generation operation of a sound source generator 3h is stopped. As a result, the hold sound having been output from the analog telephone TEL2 on the held party side is stopped. Subsequently, the voice communication between the analog telephones TEL1 and TEL2 is resumed.

In this example, as in example 1-1 of the first embodiment, when a predetermined time has elapsed from the start of a hold period, the generation of the hold sound by the analog telephone TEL2 on the held party side or AT-HUB 132 may be automatically stopped.

EXAMPLE 4-2

Figure 24:
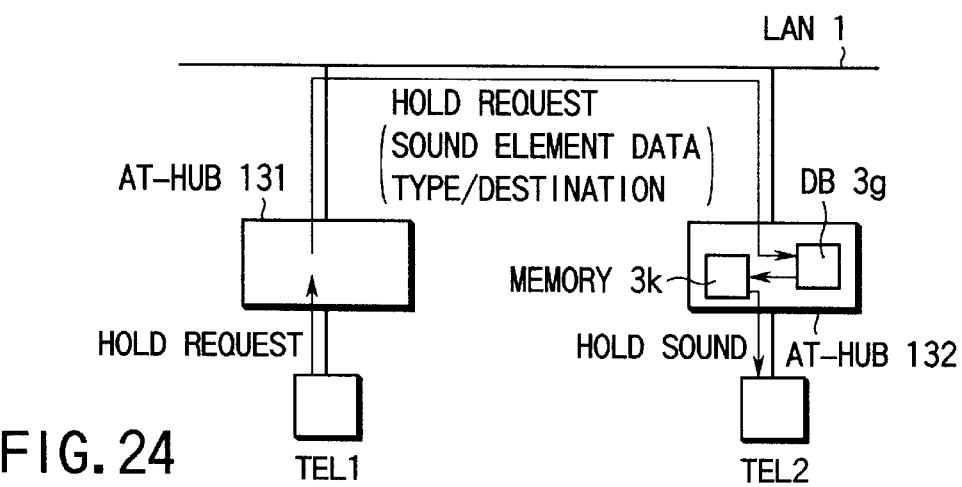
FIG. 24 is a view showing a signal transfer route to explain audible sound generating operation in the second example of the fourth embodiment.

When hold operation is performed on the analog telephone TEL1 during voice communication, a hold request is output from the analog telephone TEL1, as shown in FIG. 24. Upon reception of the hold request, the signal analyzer 3d in the AT-HUB 131 determines that the request is a hold request. The sound element data selector 3f determines the type of sound element data for a hold sound on the basis of the determination result. The hold request in which the sound element data type information and the destination information of the analog telephone TEL2 on the held party side are inserted is output from the network I/F 3a to the LAN 1 to be sent to the analog telephone TEL2 of the other party.

In the AT-HUB 132 accommodating the analog telephone TEL2 on the held party side, when the hold request addressed to the analog telephone TEL2 accommodated in the AT-HUB 132 is received through the LAN 1, the sound element data type information is extracted from the hold request. The sound element data selector 3f then selectively reads out the corresponding sound element data from the sound element database 3g on the basis of the sound element data type information. The readout sound element data is written in the sound element data memory 3k. When the sound element data is completely written in the sound element data memory 3k, transmission of the hold request from the AT-HUB 131 to the AT-HUB 132 is complete. Thereafter, in the AT-HUB 132, sound element data is repeatedly read out from the sound element data memory 3k, and a hold sound is continuously generated from the sound source generator 3h on the basis of the readout sound element data. The hold sound is then sent from the analog telephone I/F 3b to the analog telephone TEL2 on the held party side.

With this operation, the hold sound is continuously output from the analog telephone TEL2 of the other party to allow the user of the analog telephone TEL2 to recognize that the telephone TEL1 is on hold.

When reset operation is performed on the analog telephone TEL1 on the hold party side, a reset request is output from the analog telephone TEL1. As a result, in the AT-HUB 131, request data corresponding to the reset request is generated and output from the network I/F 3a to the LAN 1 to be sent to the analog telephone TEL2 of the other party.

In the AT-HUB 132 to which the analog telephone TEL2 on the held party side is connected, when the reset request data addressed to the analog telephone TEL2 connected to the AT-HUB 132 is received through the LAN 1, the hold sound generation operation of the sound source generator 3h is stopped. As a result, the hold sound output from the analog telephone TEL2 on the held party side is stopped. Subsequently, the voice communication between the analog telephones TEL1 and TEL2 is resumed.

In example 4-2, as in first example 4-1, when a predetermined time has elapsed from the start of a hold period, the generation of the hold sound by the analog telephone TEL2 on the held party side or AT-HUB 132 may be automatically stopped.

As described above, according to the fourth embodiment of the present invention, the sound element data memory 3k is installed in the AT-HUB 130. When hold operation or the like is performed on the analog telephones TEL1 and TEL2 during voice communication, an AT-HUB 131 to which the analog telephone TEL1 on the hold party side is connected selectively reads out necessary sound element data from the sound element database 3g. The sound element data or sound element data type information is output to the LAN 1 to be sent to the analog telephone TEL2 on the held party side. The AT-HUB 132 on the held party side reads out sound element data from the sound element database 3g on the basis of the sent sound element data or reads out sound element data corresponding to the sent sound element data type information. The readout sound element data is written in the sound element data memory 3k. When the sound element data is completely written in the sound element data memory 3k, transmission of the hold request from the AT-HUB 131 to the AT-HUB 132 is complete. Thereafter, in the AT-HUB 132 on the held party side, sound element data is repeatedly read out from the sound element data memory 3k, and a hold sound is continuously generated from the sound source generator 3h on the basis of the readout sound element data. The resultant signal is sent to the analog telephone TEL2 on the held party side to output an audible sound.

With this operation, a hold sound can be continuously generated from the analog telephone TEL2 on the held party side without continuously sending a hold request from the analog telephone TEL1 on the holding party side to the analog telephone TEL2 on the held party side. The traffic during a hold period can be decreased, and hence the transmission efficiency of the system can be increased accordingly.

[Fifth Embodiment]

The fifth embodiment is a modification of the second embodiment. In the fifth embodiment, a sound element database is installed in an ISDN router. Although the overall arrangement of the fifth embodiment is the same as that of the second embodiment, the arrangement of an analog telephone hub differs from that in the second embodiment. More specifically, in addition to the arrangement of the second embodiment, as shown in FIG. 22, an AT-HUB 130 includes a sound element data memory 3k for storing sound element data supplied from a LAN 1, as in the arrangement of the fourth embodiment.

The audible sound generating operation of the system having the above arrangement will be described next with reference to the following three examples. Assume that in each example, hold operation is performed on an analog telephone TEL1 accommodated in an AT-HUB 131 during voice communication, and a hold sound is generated from an telephone TEL2 of the other party which is accommodated in an AT-HUB 132.

EXAMPLE 5-1

Figure 25:
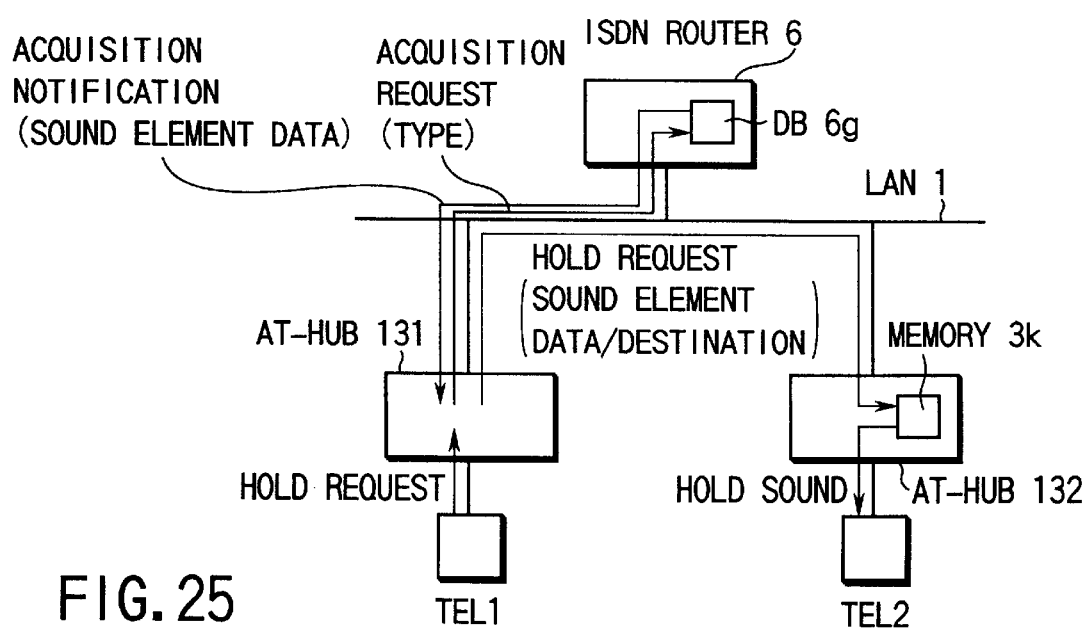
FIG. 25 is a view showing a signal transfer route to explain audible sound generating operation in the first example of the fifth embodiment of the present invention.

As shown in FIG. 25, when the analog telephone TEL1 performs hold operation while communicating with the analog telephone TEL2, a hold request is output. Upon reception of the hold request, a signal analyzer 3d in the AT-HUB 131 determines that the request is a hold request, and a sound element data selector 3f determines the type of sound element data for a hold sound on the basis of the determination result. Then, a sound element data acquisition request in which the sound element data type is inserted is generated and sent from a network I/F 3a to an ISDN router 6.

Upon reception of the sound element data acquisition request through the LAN 1, a signal analyzer 6d in the ISDN router 6 extracts the sound element data type information from the acquisition request. A sound element data selector 6f searches a sound element database 6g on the basis of the sound element data type information. As a result, the corresponding sound element data is selectively read out. The sound element data is inserted in an acquisition notification. The notification is packeted and output from a network I/F 6b to the LAN 1 to be sent to an AT-HUB 131 as a source for the acquisition request to which the analog telephone TEL1 on the holding party side is connected.

In the AT-HUB 131, when the sound element data acquisition notification is received from the ISDN router 6 after the acquisition request is sent, the sound element data is extracted from the acquisition notification, and a hold request in which the sound element data and destination information are inserted is generated. A sound element data generator 6j outputs the hold request from a network I/F 6b to the LAN 1 to send it to the analog telephone TEL2 on the held party side.

In an AT-HUB 132 accommodating the analog telephone TEL2 on the held party side, when the hold request addressed to the analog telephone TEL2 accommodated in the AT-HUB 132 is received through the LAN 1, the sound element data is extracted from the hold request. The sound element data is written in the sound element data memory 3k. When the sound element data is completely written in the sound element data memory 3k, transmission of the hold request from the AT-HUB 131 to the AT-HUB 132 is complete. Thereafter, in the AT-HUB 132, sound element data is repeatedly read out from the sound element data memory 3k, and a hold sound is continuously generated from a sound source generator 3h on the basis of the readout sound element data. The hold sound is then sent from an analog telephone I/F 3b to the analog telephone TEL2 on the held party side.

With this operation, the hold sound is continuously output from the analog telephone TEL2 of the other party to allow the user of the analog telephone TEL2 to recognize that the telephone TEL1 is on hold.

When reset operation is performed on the analog telephone TEL1 on the hold party side, a reset request is output from the analog telephone TEL1. As a result, in the AT-HUB 131, request data corresponding to the reset request is generated and output from the network I/F 3a to the LAN 1 to be sent to the analog telephone TEL2 of the other party.

In the AT-HUB 132 to which the analog telephone TEL2 on the held party side is connected, when the reset request data addressed to the analog telephone TEL2 connected to the AT-HUB 132 is received through the LAN 1, the hold sound generation operation of the sound source generator 3h is stopped. As a result, the hold sound having been output from the analog telephone TEL2 on the held party side is stopped. Subsequently, the voice communication between the analog telephones TEL1 and TEL2 is resumed.

In example 5-1, as in first example 2-1 of the second embodiment described above, when a predetermined time has elapsed from the start of a hold period, the generation of the hold sound by the analog telephone TEL2 on the held party side or AT-HUB 132 may be automatically stopped.

EXAMPLE 5-2

Figure 26:
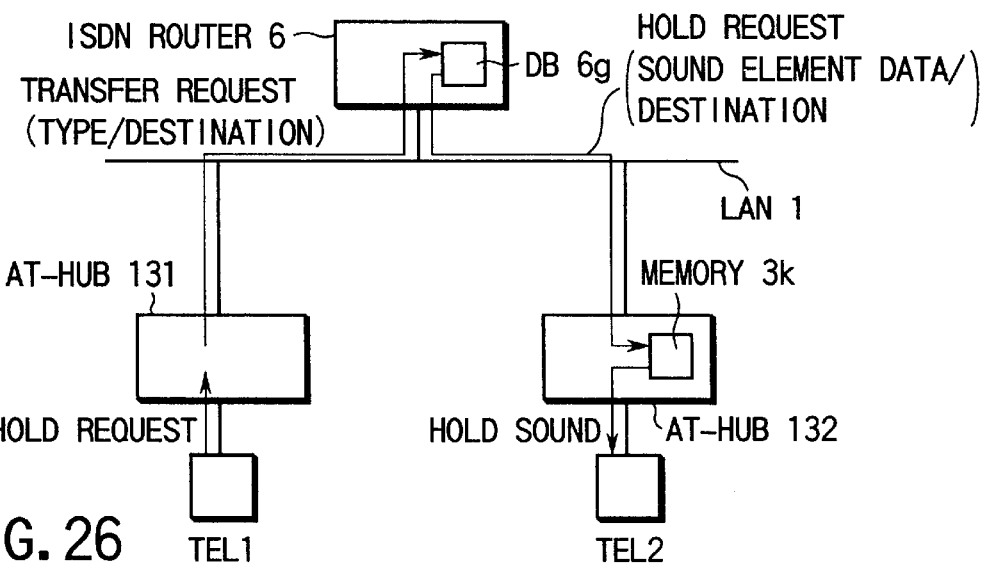
FIG. 26 is a view showing a signal transfer route to explain audible sound generating operation in the second example of the fifth embodiment.

When hold operation is performed on the analog telephone TEL1 during voice communication, a hold request is output from the analog telephone TEL1, as shown in FIG. 26. Upon reception of the hold request, the signal analyzer 3d in the AT-HUB 131 determines that the request is a hold request, and the sound element data selector 3f determines the type of sound element data for a hold sound on the basis of the determination result. A sound element data transfer request in which the sound element data type information and the destination information of the analog telephone TEL2 as the other party on the held party side are inserted is generated. The sound element data transfer request is packeted and output from the network I/F 3a to the LAN 1 to be sent to the ISDN router 6.

Upon reception of the sound element data transfer request through the LAN 1, the signal analyzer 6d in the ISDN router 6 extracts the sound element data type information from the transfer request. The sound element data selector 6f then searches the sound element database 6g on the basis of the sound element data type information. As a result, the corresponding sound element data is selectively read out. The sound element data is inserted in the hold request together with the destination information of the analog telephone TEL2 on the held party side. The hold request is packeted. This packet is output from the network I/F 6b to the LAN 1 to be sent to the analog telephone TEL2 on the held party side.

In the AT-HUB 132 accommodating the analog telephone TEL2 on the held party side, when the hold request addressed to the analog telephone TEL2 accommodated in the AT-HUB 132 is received through the LAN 1, the sound element data is extracted from the hold request. The extracted sound element data is written in the sound element data memory 3k. When the sound element data is completely written in the sound element data memory 3k, transmission of the transfer request from the AT-HUB 131 to the ISDN router 6 and transmission of the hold request from the ISDN router 6 to the AT-HUB 132 are complete. Thereafter, in the AT-HUB 132, sound element data is repeatedly read out from the sound element data memory 3k, and a hold sound is continuously generated from the sound source generator 3h on the basis of the readout sound element data. The hold sound is then sent from the analog telephone I/F 3b to the analog telephone TEL2 on the held party side.

With this operation, the hold sound is continuously output from the analog telephone TEL2 of the other party to allow the user of the analog telephone TEL2 to recognize that the telephone TEL1 is on hold.

When reset operation is performed on the analog telephone TEL1 on the hold party side, a reset request is output from the analog telephone TEL1. As a result, in the AT-HUB 131, request data corresponding to the reset request is generated and output from the network I/F 3a to the LAN 1 to be sent to the analog telephone TEL2 of the other party.

In the AT-HUB 132 to which the analog telephone TEL2 on the held party side is connected, when the reset request data addressed to the analog telephone TEL2 connected to the AT-HUB 132 is received through the LAN 1, the hold sound generation operation of the sound source generator 3h is stopped. As a result, the hold sound having been output from the analog telephone TEL2 on the held party side is stopped. Subsequently, the voice communication between the analog telephones TEL1 and TEL2 is resumed.

In this example, as in first example 5-1 described above, when a predetermined time has elapsed from the start of a hold period, the generation of the hold sound by the analog telephone TEL2 on the held party side or AT-HUB 132 may be automatically stopped.

EXAMPLE 5-3

Figure 27:
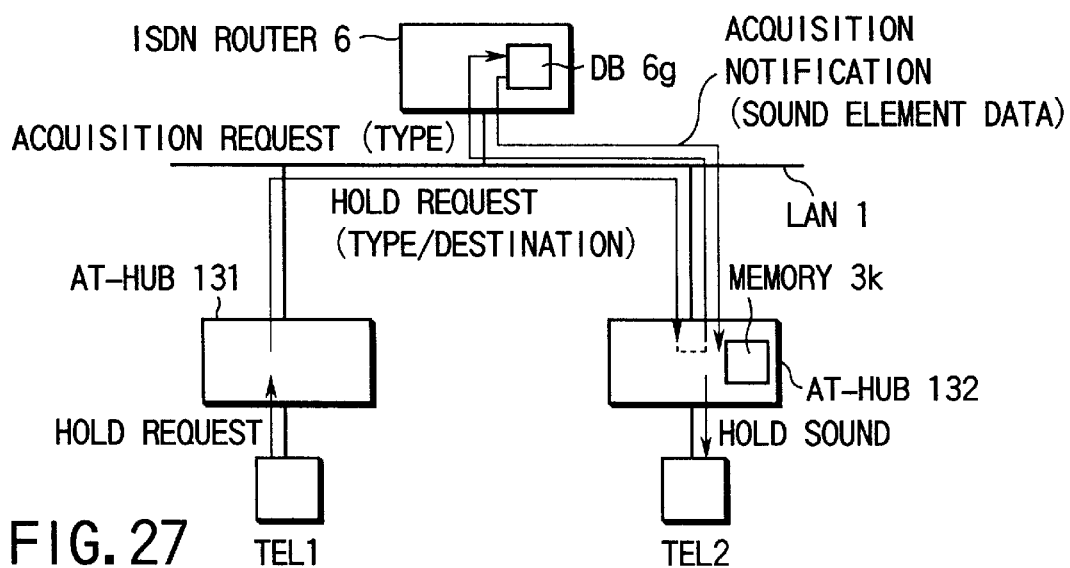
FIG. 27 is a view showing a signal transfer route to explain audible sound generating operation in the fourth example of the fifth embodiment.

When hold operation is performed on the analog telephone TEL1 during voice communication, a hold request is output from the analog telephone TEL1, as shown in FIG. 27. Upon reception of the hold request, the signal analyzer 3d in the AT-HUB 131 determines that the request is a hold request, and the sound element data selector 3f determines the type of sound element data for a hold sound on the basis of the determination result. A hold request in which the determined sound element data type and the destination information of the analog telephone TEL2 on the held party side are inserted is generated. The hold request is output from the network I/F 3a to the LAN 1 to be sent to the analog telephone TEL2 on the held party side.

In the AT-HUB 132 accommodating the analog telephone TEL2 on the held party side, when the hold request addressed to the analog telephone TEL2 is received, the sound element data type is extracted from the hold request, and a sound element data acquisition request in which the sound element data type information is inserted is generated. The sound element data acquisition request is output from the network I/F 3a to the LAN 1 to be sent to the ISDN router 6.

Upon reception of the sound element data acquisition request through the LAN 1, the signal analyzer 6d in the ISDN router 6 extracts the sound element data type information from the sound element data acquisition request. The sound element data selector 6f then searches the sound element database 6g on the basis of the sound element data type information. As a result, the corresponding sound element data is selectively read out. The sound element data is inserted in an acquisition notification. The acquisition notification is output from the network I/F 6b to the LAN 1 to be sent to the AT-HUB 132 as the acquisition request source.

In the AT-HUB 132 accommodating the analog telephone TEL2 on the held party side, when the acquisition notification addressed to the analog telephone TEL2 accommodated in the AT-HUB 132 comes from the ISDN router 6 through the LAN 1 after the sound element data acquisition request is output, the sound element data is extracted from the acquisition notification, and the extracted sound element data is written in the sound element data memory 3k. When the sound element data is completely written in the sound element data memory 3k, transmission of the acquisition notification from the ISDN router 6 to the AT-HUB 132 is complete. Thereafter, in the AT-HUB 132 on the held party side, sound element data is repeatedly read out from the sound element data memory 3k, and a hold sound is continuously generated from the sound source generator 3h on the basis of the readout sound element data. The hold sound is then sent from the analog telephone I/F 3b to the analog telephone TEL2 on the held party side.

With this operation, the hold sound is continuously output from the analog telephone TEL2 of the other party to allow the user of the analog telephone TEL2 to recognize that the telephone TEL1 is on hold.

When reset operation is performed on the analog telephone TEL1 on the hold party side, a reset request is output from the analog telephone TEL1. As a result, in the AT-HUB 131, request data corresponding to the reset request is generated and output from the network I/F 3a to the LAN 1 to be sent to the analog telephone TEL2 of the other party.

In the AT-HUB 132 to which the analog telephone TEL2 on the held party side is connected, when the reset request data addressed to the analog telephone TEL2 connected to the AT-HUB 132 is received through the LAN 1, the hold sound generation operation of the sound source generator 3h is stopped. As a result, the hold sound having been output from the analog telephone TEL2 on the held party side is stopped. Subsequently, the voice communication between the analog telephones TEL1 and TEL2 is resumed.

In this example, as in first and second examples 5-2 and 5-3 described above, when a predetermined time has elapsed from the start of a hold period, the generation of the hold sound by the analog telephone TEL2 on the held party side or AT-HUB 132 may be automatically stopped.

As described above, according to the fifth embodiment of the present invention, the sound element data memory 3k is installed in the AT-HUB 130. When hold operation or the like is performed on the analog telephones TEL1 and TEL2 during voice communication, necessary sound element data is selectively read out from the sound element database 6g in the ISDN router 6. The sound element data is then output to the LAN 1 to be sent to the analog telephone TEL2 on the held party side. In the AT-HUB 132 on the held party side, the sent sound element data is written in the sound element data memory 3k. When the sound element data is completely written in the sound element data memory 3k, transmission of the sound element data from the ISDN router 6 to the AT-HUB 132 is complete. Thereafter, in the AT-HUB 132 on the held party side, sound element data is repeatedly read out from the sound element data memory 3k, and a hold sound is continuously generated from the sound source generator 3h on the basis of the readout sound element data. The resultant signal is sent to the analog telephone TEL2 on the held party side to output an audible sound.

With this operation, a hold sound can be continuously generated from the analog telephone TEL2 on the held party side without continuously sending a hold request from the ISDN router 6 to the analog telephone TEL2 on the held party side. The traffic during a hold period can be decreased, and hence the transmission efficiency of the system can be increased accordingly.

[Sixth Embodiment]

The sixth embodiment is associated with a modification of the third embodiment. In this embodiment, a sound element database is installed in a communication server 8. The overall arrangement of the sixth embodiment is the same as that of the third embodiment. In the sixth embodiment as well, as shown in FIG. 22, an analog telephone hub has a sound element data memory storing sound element data.

The sixth embodiment is equivalent to the fourth embodiment described above except that the ISDN router 6 is replaced with the communication server 8. A detailed description of the sixth embodiment will be omitted.

[Seventh Embodiment]

The above embodiments are associated with the case wherein the first communication terminal device generates an audible sound from the second communication terminal device. As the seventh embodiment, however, a case wherein the first communication terminal device generates an audible sound (dial tone) from itself will be described with reference to the following four examples.

EXAMPLE 7-1

Figure 28:
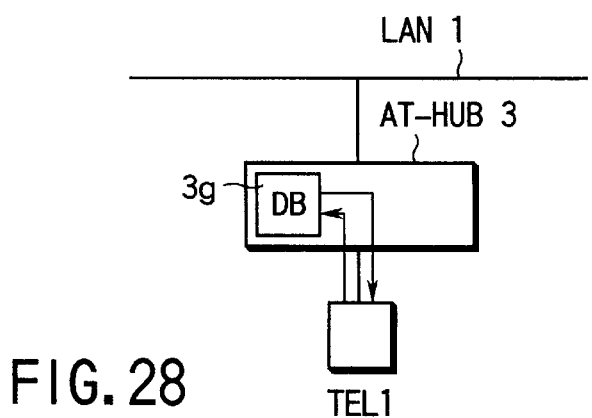
FIG. 28 is a view showing a signal transfer route to explain audible sound generating operation in the first example of the seventh embodiment of the present invention.

FIG. 28 shows the system configuration of a multimedia data communication system according to the first example of the seventh embodiment. A sound element database 3g in an AT-HUB 3 stores sound element data of a dial tone to be generated when off-hook operation is performed.

As shown in FIG. 28, when an analog telephone TEL1 performs off-hook operation, an off-hook request is output. Upon reception of the off-hook request, a signal analyzer 3d in the AT-HUB 3 determines that the request is an off-hook request. A sound element data selector 3f determines the type of sound element data for a dial tone on the basis of the determination result. The sound element database 3g is searched on the basis of the sound element data type information, and the corresponding sound element data (sound element data for the dial tone) is selectively read out. The sound element data is then sent to the analog telephone TEL1 in the off-hook state.

With this operation, the dial tone is output from the analog telephone TEL1 in the off-hook state to allow the user to recognize that the telephone TEL1 is off-hook.

EXAMPLE 7-2

Figure 29:
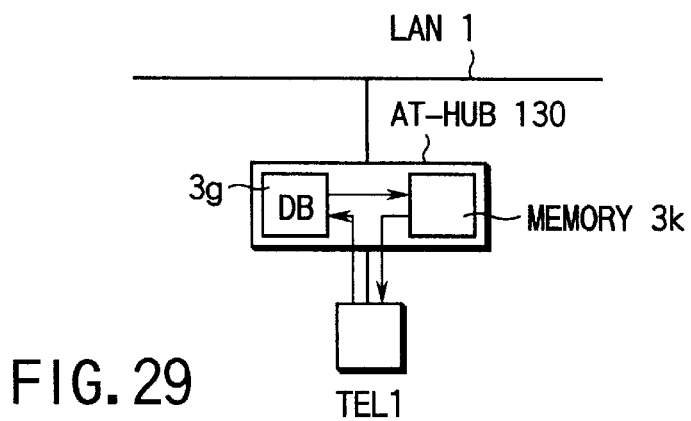
FIG. 29 is a view showing a signal transfer route to explain audible sound generating operation in the second example of the seventh embodiment.

The second example differs from the first embodiment in that an AT-HUB 130 has a sound element data memory 3k. As shown in FIG. 29, when the analog telephone TEL1 performs off-hook operation, an off-hook request is output. Upon reception of the off-hook request, the signal analyzer 3d in the AT-HUB 130 determines that the request is an off-hook request. The sound element data selector 3f determines the type of sound element data for a dial tone on the basis of the determination result. The sound element database 3g is searched on the basis of the sound element data type information, and the corresponding sound element data (sound element data for the dial tone) is selectively read out. The readout sound element data is written in the sound element data memory 3k. Thereafter, the sound element data is repeatedly read out from the sound element data memory 3k to continuously generate the dial tone from a sound source generator 3h on the basis of the readout sound element data. The dial tone is then supplied from an analog telephone I/F 3b to the analog telephone TEL1.

With this operation, the dial tone is output from the analog telephone TEL1 in the off-hook state to allow the user to recognize that the telephone TEL1 is off-hook.

EXAMPLE 7-3

Figure 30:
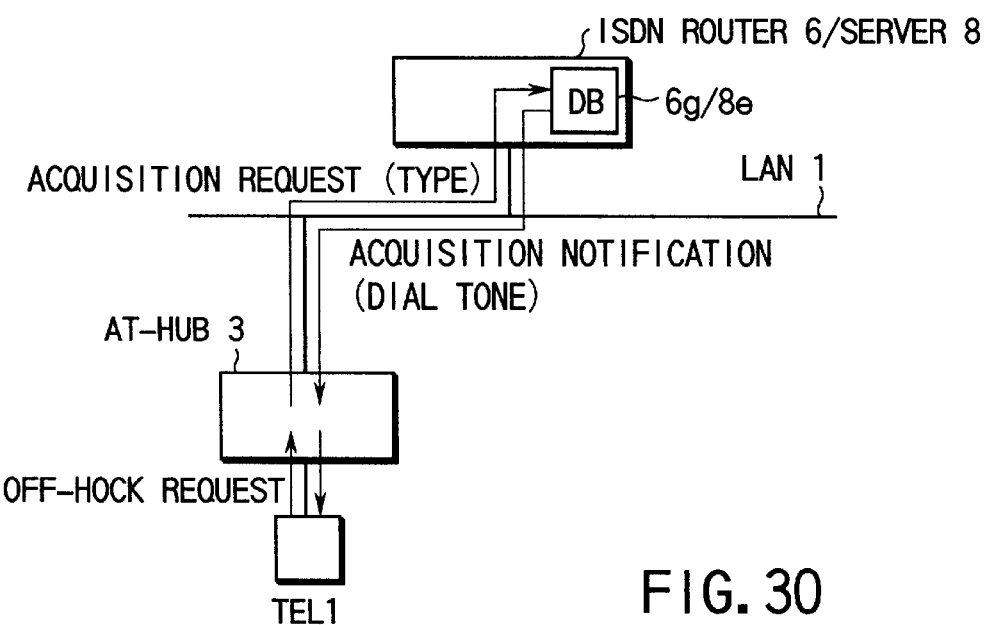
FIG. 30 is a view showing a signal transfer route to explain audible sound generating operation in the third example of the seventh embodiment.

FIG. 30 shows the system configuration of a multimedia data communication system according to the third example of the seventh embodiment. A sound element database 6g in an ISDN router 6 or a sound element database 8e in a communication server 8 stores sound element data for a dial tone to be generated when off-hook operation is performed.

As shown in FIG. 30, when the analog telephone TEL1 performs off-hook operation, an off-hook request is output. Upon reception of the off-hook request, the signal analyzer 3d in the AT-HUB 3 determines that the request is an off-hook request. The sound element data selector 3f determines the type of sound element data for a dial tone on the basis of the determination result. An acquisition request in which the sound element data type is inserted is generated and output from a network I/F 3a to the ISDN router 6 or communication server 8.

Upon reception of the sound element data acquisition request through a LAN 1, a signal analyzer 6d in the ISDN router 6 or a signal analyzer 8b in the communication server 8 extracts the sound element data type information from the acquisition request. A sound element data selector 6f or 8d searches the sound element database 6g or 8e on the basis of the sound element data type information. With this operation, the corresponding sound element data is selectively read out. The sound element data is then inserted in an acquisition notification. This notification is packeted and output from a network I/F 6b to the LAN 1 to be sent to the AT-HUB 3 as the acquisition request source to which the analog telephone TEL1 in the off-hook state is connected.

In the AT-HUB 3, when the acquisition notification is received from the ISDN router 6 or communication server 8, the sound element data is extracted from the acquisition notification, and the dial tone is generated from the sound source generator 3h on the basis of the sound element data. The dial tone is then supplied from the analog telephone I/F 3b to the analog telephone TEL1.

With this operation, the dial tone is output from the analog telephone TEL1 in the off-hook state to allow the user to recognize that the telephone is off-hook.

EXAMPLE 7-4

Figure 31:
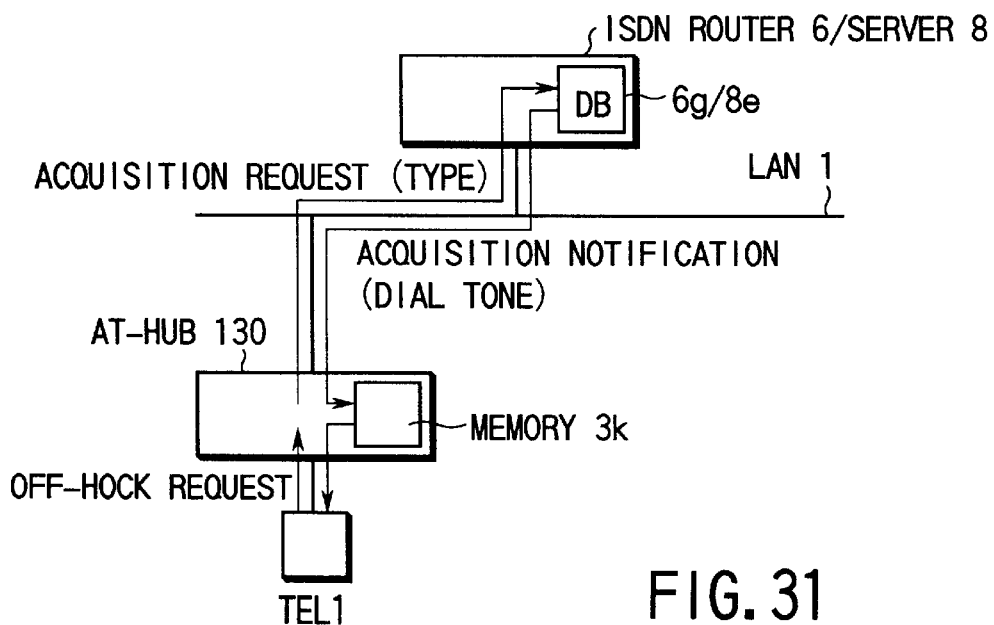
FIG. 31 is a view showing a signal transfer route to explain audible sound generating operation in the fourth example of the seventh embodiment.

The fourth example differs from third example 7-3 in that the AT-HUB 130 has the sound element data memory 3k. As shown in FIG. 31, when the analog telephone TEL1 performs off-hook operation, an off-hook request is output. Upon reception of the off-hook request, the signal analyzer 3d in the AT-HUB 130 determines that the request is an off-hook request. The sound element data selector 3f determines the type of sound element data for a dial tone on the basis of the determination result. An acquisition request in which the sound element data type information is inserted is generated. The acquisition request is then output from the network I/F 3a to the ISDN router 6 or communication server 8.

Upon reception of the sound element data acquisition request through the LAN 1, the signal analyzer 6d in the ISDN router 6 or signal analyzer 8b in the communication server 8 extracts the sound element data type information from the acquisition request. The sound element data selector 6f or 8d searches the sound element database 6g or 8e on the basis of the sound element data type information to selectively read out the corresponding sound element data. The sound element data is inserted in an acquisition notification. The acquisition notification is packeted and output from the network I/F 6b to the LAN 1 to be sent to the AT-HUB 130 as the acquisition request source to which the analog telephone TEL1 in the off-hook state is connected.

In the AT-HUB 130, when the acquisition notification is received from the ISDN router 6 or communication server 8 after the sound element data acquisition request is sent, the sound element data is extracted from the acquisition notification, and the extracted sound element data is written in the sound element data memory 3k. When the sound element data is completely written in the sound element data memory 3k, the transmission of the acquisition notification from the ISDN router 6 or communication server 8 to the AT-HUB 130 is complete. Thereafter, in the AT-HUB 130, the sound element data is repeatedly read out from the sound element data memory 3k to continuously generate a dial tone from the sound source generator 3h on the basis of the readout sound element data. The dial tone is then supplied from the analog telephone I/F 3b to the analog telephone TEL1.

With this operation, the dial tone is output from the analog telephone TEL1 in the off-hook state to allow the user to recognize that the telephone is off-hook.

[Eighth Embodiment]

An embodiment in which the state of a communication terminal device of the other party is notified to a call originating party in the form of a voice message will be described next with reference to the following three examples.

EXAMPLE 8-1

Figure 32:
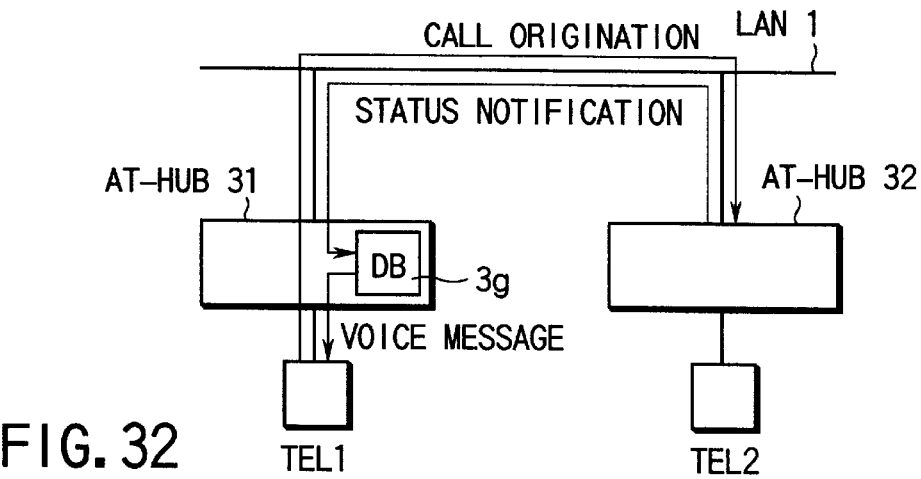
FIG. 32 is a view showing a signal transfer route to explain audible sound generating operation in the first example of the eighth embodiment of the present invention.

Referring to FIG. 32, sound element data for generating voice messages indicating the user information (name and the like) of the communication terminal device and the operation state (busy or the like) of the communication terminal device are stored in a sound element database 3g in an AT-HUB 31 of the call originating party. Assume that when a call originating party TEL1 originates a call to other party TEL2, the called terminal TEL2 is busy. An AT-HUB 32 on the called terminal side notifies the AT-HUB 31 on the call originating terminal device side of the user information and operation state of the called terminal TEL2. Upon reception of the notification indicating that the called terminal TEL2 is busy, the AT-HUB 31 reads out sound element data indicating the user information of the called terminal TEL2 and sound element data indicating that the called terminal is busy from the sound element database 3g, and converts the data into voice messages. The voice messages are then sent to the call originating party.

EXAMPLE 8-2

Figure 33:
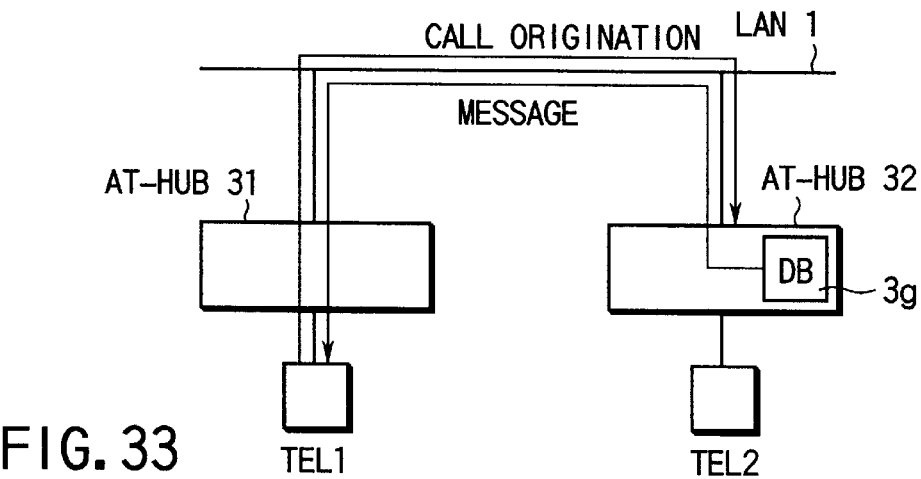
FIG. 33 is a view showing a signal transfer route to explain audible sound generating operation in the second example of the eighth embodiment.

Referring to FIG. 33, sound element data for generating voice messages indicating the user information (name and the like) of the communication terminal device and the operation state (busy or the like) of the communication terminal device are stored in a sound element database 3g in the AT-HUB 32 of the called terminal. Assume that when the call originating party TEL1 originates a call to the other party TEL2, the called terminal TEL2 is busy. The AT-HUB 32 on the called terminal side reads out sound element data indicating the user information of the called terminal TEL2 and sound element data indicating that the called terminal is busy from the sound element database 3g, and converts the data into voice messages. The AT-HUB 32 then notifies the AT-HUB 31 on the call originating terminal device side of the voice messages. The AT-HUB 31 sends the voice messages to the call originating party.

EXAMPLE 8-3

Figure 34:
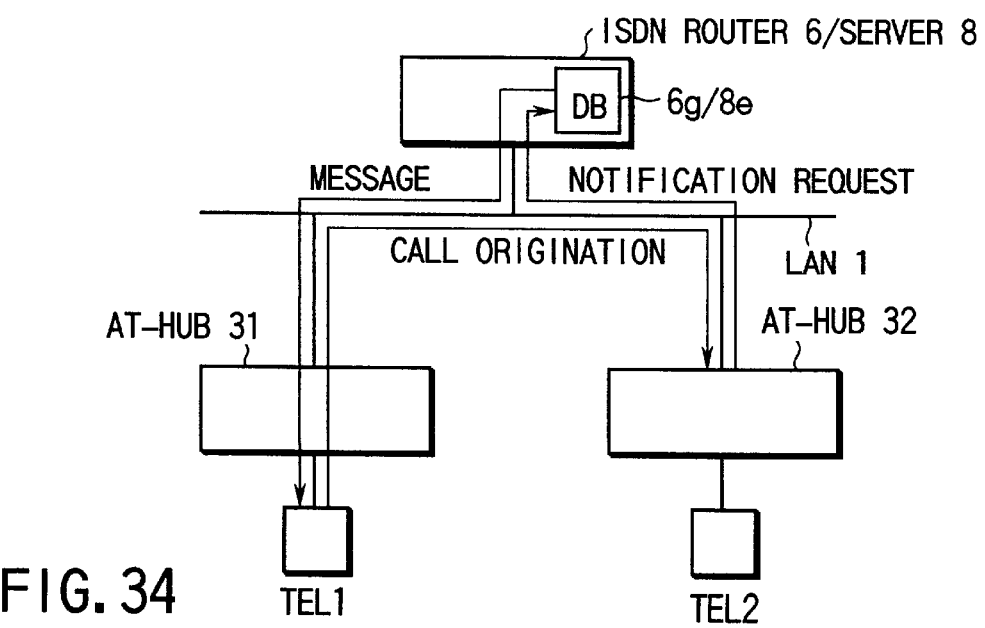
FIG. 34 is a view showing a signal transfer route to explain audible sound generating operation in the third example of the eighth embodiment.

Referring to FIG. 34, sound element data for generating voice messages indicating the user information (name and the like) of the communication terminal device and the operation state (busy or the like) of the communication terminal device are stored in a sound element database 6g or 8e in an ISDN router 6 or a communication server 8. Assume that when the call originating party TEL1 originates a call to the other party TEL2, the called terminal TEL2 is busy. The AT-HUB 32 on the called terminal side sends a notification request containing the user information of the called terminal TEL2 and state information indicating that the called terminal TEL2 is busy to the ISDN router 6 or the communication server 8. Upon reception of the notification request, the ISDN router 6 or the communication server 8 reads out sound element data indicating the user information of the called terminal TEL2 and sound element data indicating that the called terminal TEL2 is busy from the sound element database 6g or 8e, and converts the data into voice messages. The ISDN router 6 or the communication server 8 then notifies the AT-HUB 31 on the call originating terminal device side of the voice messages. The AT-HUB 31 sends the voice messages to the call originating party.

As has been described in detail above, according to the present invention, a communication interface serving as a terminal interface or extension interface or a communication server device has a sound element database storing sound element data required to generate audible sounds. When a communication terminal device sends a request to generate the audible sound to a communication terminal device of the other party, the sound element database is accessed through the communication interface to selectively read out sound element data corresponding to the request from the sound element database. The sound element data is transferred to the communication interface on the other party side, thereby generating an audible sound corresponding to the sound element data from the communication terminal device of the other party.

According to the present invention, therefore, there is no need to digitize and directly transmit an audible sound between communication terminal devices. This allows efficient transmission and generation of audible sounds. Therefore, there is provided a multimedia data communication system capable of effectively sending an audible sound indicating the operation state of a given communication terminal device to the communication terminal device of the other party.

In the present invention, only sound element data of one cycle is sent, and the communication terminal device continuously uses this data to continuously generate an audible sound notifying the operation state of the communication terminal device. In addition, as an audible sound notifying the operation state of the communication terminal device, a voice message is used as well as a tone.

According to the present invention, therefore, there is no need to continuously send sound element data through a network or continuously access a database storing sound element data in order to generate a continuous audible sound notifying the operation state of the communication terminal device. This allows efficient transmission and generation of audible sounds.

By notifying the operation state of the communication terminal device using a voltage message as well as a tone, the operation state of the device can be notified to the user more intelligibly.

The present invention is not limited to the embodiments described above, and various modifications of the embodiments can be made. For example, in each embodiment described above, necessary sound element data are stored beforehand in the sound element database installed in each of the hubs 3, 4, and 5, each of the routers 6 and 7, and the communication server 8. In some cases, however, sound element data settings must be changed during operation. For example, registered sound element data must be deleted or changed or new sound element data must be added. In such a case, necessary operation can be collectively performed by using the data transfer device 9.

More specifically, for example, a person in charge of maintaining the system designates sound element data to be deleted or changed through the data transfer device 9. When new sound element data is to be added, the person inputs the data through the data transfer device 9. The person then designates a database for the sound element data to be changed. As a result, setting request data generated in accordance with the designated contents is selectively sent from the data transfer device 9 to each of the hubs 3, 4, and 5, each of the routers 6 and 7, or the communication server 8, which has a sound element database in which the data is to be set, through the LAN 1.

Upon reception of the setting request data, each of the hubs 3, 4, and 5, each of the routers 6 an 7, or the communication server 8 deletes or changes the corresponding sound element data in the sound element database or adds new data to the database in accordance with the received contents. Note that data setting can be performed by using the data transfer device described above not only as setting after the start of the system but also as new setting before the start of the system.

With this arrangement, the person in charge of maintenance can efficiently set sound element data remotely and intensively by using the data transfer device 9 installed in a control center or the like without going out to the communication interface having the sound element database for which the setting is to be performed.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents. For example, the present invention is not limited to communication between the analog telephones TEL1 and TEL2, but can be applied to communication between the radio terminals PS1 and PS2 accommodated in the base station 2 and the analog telephones TEL1 and TEL2, communication between the digital telephones DKT1 and DKT2 accommodated in the DT-HUB 4 and the radio terminals PS1 and PS2 or the analog telephones TEL1 and TEL2, and communication between the personal computers PC1 and PC2 accommodated in the DATA-HUB 5 and the analog telephones TEL1 and TEL2, the digital telephones DKT1 and DKT2, or the radio terminals PS1 and PS2. In addition, the present invention can be applied to communication between each terminal device and each of the PSTN routers 6 and 7 and communication between each terminal device and the communication server 8.

Furthermore, in each embodiment described above, an audible sound is generated. Instead of the audible sound, however, a voice message may be generated by using a voice synthesizing means.

Moreover, the arrangement of the system, the arrangements of each communication interface and each router, the arrangement of the communication server, the sound element data acquisition procedure, the sound element data acquisition notification procedure, the sound element data transfer procedure, and the like can be variously modified within the spirit and scope of the invention.

What is claimed is:

1. A multimedia data communication system comprising:
    communication terminals for transmitting/receiving information data in accordance with a first communication protocol;
    a communication network for transmitting information data in accordance with a second communication protocol;
    communication interfaces each converting a communication protocol between said communication terminals and said communication network;
    a sound element database for storing sound element data for generating an audible sound indicating an operation state of a first communication terminal; and
    a sound generating circuit for, when said first communication terminal outputs a request to generate an audible sound indicating the operation state thereof from a second communication terminal, reading out sound element data corresponding to the request from said sound element database, and transferring the sound element data to said second communication terminal, thereby causing said second communication terminal to generate the audible sound corresponding to the sound element data.

2. A system according to claim 1, wherein said sound generating circuit comprises:
    a sending device, provided in a first communication interface of said communication interfaces to which said first communication terminal is connected, for reading out corresponding sound element data from said sound element database, and sending the readout sound element data to said second communication terminal through said communication network; and
    a sound generator, provided in a secon communication interface of said communication interfaces to which said second communication terminal is connected, for generating the audible sound corresponding to the sound element data sent from said sending device, and causing said second communication terminal to output the audible sound.

3. A system according to claim 1, wherein said sound generating circuit comprises:
   a sending device, provided in a first communication interface of said communication interfaces to which said first communication terminal is connected, for sending type information of sound element data corresponding to the audible sound, for which said first communication terminal has made a generation request, to said second communication terminal through said communication network; and
   a sound generator, provided in a second communication interface of said communication interfaces to which said second communication terminal is connected, for reading out from said sound element database sound element data corresponding to the sound element data type information sent from said sending device, generating the audible sound corresponding to the readout sound element data, and causing said second communication terminal to output the audible sound.

4. A multimedia data communication system comprising:
   communication terminals for transmitting/receiving information data in accordance with a first communication protocol;
   a communication network for transmitting information data in accordance with a second communication protocol;
   first communication interfaces each converting a communication protocol between said communication terminals and said communication network; and
   a second communication interface for converting a communication protocol between said communication network and an external communication network for transmitting information data in accordance with a third communication protocol,
   said second communication interface including:
      a sound element database for storing sound element data for generating an audible sound indicating an operation state of a first communication terminal; and
      a sound generating circuit for, when said first communication terminal outputs a request to generate an audible sound indicating an operation state of said first communication terminal from a second communication terminal, reading out sound element data corresponding to the request from said sound element database, transferring the data to said second communication terminal, and causing said second communication terminal to generate the audible sound corresponding to the sound element data.

5. A system according to claim 4, wherein said sound generating circuit comprises:
   a first sending device, provided in a first communication interface of the first communications interfaces to which said first communication terminal is connected, for sending type information of sound element data corresponding to an audible sound requested by said first communication terminal to said second communication interface through said communication network;
   a data reading circuit, provided in said second communication interface, for reading out from said sound element database sound element data corresponding to the sound element data type information sent from said first sending device, and transferring the readout sound element data to said first communication interface, connected to said first communication terminal, through said communication network;
   a second sending device, provided in said first communication interface to which said first communication terminal is connected, for sending the sound element data transferred from said second communication interface to said second communication terminal through said communication network; and
   a sound generator, provided in a second communication interface of said first communication interfaces to which said second communication terminal is connected, for generating an audible sound corresponding to the sound element data sent from said second sending device and causing said second communication terminal to output the audible sound.

6. A system according to claim 4, wherein said sound generating circuit comprises:
   a first sending device, provided in a first communication interface of the first communications interfaces to which said first communication terminal is connected, for sending type information of sound element data corresponding to an audible sound requested by said first communication terminal to said second communication interface through said communication network;
   a second sending device, provided in said second communication interface, for reading out from said sound element database sound element data corresponding to the sound element data type information sent from said first sending device, and sending the readout sound element data to said second communication interface through said communication network; and
   a sound generator, provided in a second communication interface of said first communication interfaces to which said second communication terminal is connected, for generating an audible sound corresponding to the sound element data sent from said second sending device and causing said second communication terminal to output the audible sound.

7. A system according to claim 4, wherein said sound generating circuit comprises:
   a first transfer circuit, provided in a first communication interface of the first communications interfaces to which said first communication terminal is connected, for transferring type information of sound element data corresponding to an audible sound requested by said first communication terminal to said first communication interface, to which said second communication terminal is connected, through said communication network;
   a sending device, provided in a second communication interface of said first communication interfaces to which said second communication terminal, for sending the sound element data type information transferred from said first transfer circuit to said second communication interface through said communication network;
   a second transfer circuit, provided in said second communication interface, for reading out sound element data from said sound element database in accordance with the sound element data type information sent from said sending device, and transferring the readout sound element data to said first communication interface of the first communications, interfaces, to which said first communication terminal is connected, through said communication network; and a sound generator, provided in the second communication interface of said first communication interfaces to which said second communication terminal is connected, for generating an audible sound corresponding to the sound element data transferred from said second transfer circuit and causing said second communication terminal to output the audible sound.

8. A multimedia data communication system comprising:

communication terminals for transmitting/receiving information data in accordance with a first communication protocol;

a communication network for transmitting information data in accordance with a second communication protocol;

communication interfaces each converting a communication protocol between said communication terminals and said communication network; and a server connected to said communication network and having a database for storing identification information and address information of each of said communication interfaces, said server including:

a sound element database for storing sound element data for generating an audible sound indicating an operation state of a first communication terminal; and a sound generating circuit for, when said first communication terminal outputs a request to generate the audible sound indicating an operation state of said first communication terminal from a second communication terminal reading out sound element data corresponding to the request from said sound element database, transferring the sound element data to said second communication terminal, and causing said second communication terminal to generate the audible sound corresponding to the sound element data.

9. A system according to claim 1, further comprising an audible sound stopping circuit for stopping generation of the audible sound by said second communication terminal.

10. A system according to claim 9, wherein said audible sound stopping circuit comprises:

a sending circuit, provided in a first communication interface of said communication interfaces to which said first communication terminal is connected, for, when said first communication terminal outputs an audible sound stopping request, sending the stopping request to said second communication terminal through said communication network; and a sound stopper, provided in a second communication interface of said communication interfaces to which said second communication terminal is connected, for stopping generation of the audible sound in response to the audible sound stopping request output from said sending circuit.

11. A system according to claim 9, wherein said audible sound stopping circuit is provided in said second communication interface to which said second communication terminal is connected, monitors a generation time of the audible sound in said second communication terminal, and stops generation of the audible sound when the generation time exceeds a predetermined time.

12. A system according to claim 1, further comprising a sound element data setting control circuit for, when a sound element data registration or deletion request is sent from said first or second communication terminal, registering or deleting sound element data in or from said sound element database in accordance with contents of the request.

13. A system according to claim 1, wherein said sound element database stores a sound element data element for generating a one-cycle audible sound, and said sound generating circuit generates a continuous audible sound by repeatedly using the sound element data element.

14. A system according to claim 13, wherein said sound generating circuit comprises a sound element data memory for storing the sound element data element.

15. A system according to claim 1, wherein said sound element database stores sound element data for generating a hold sound.

16. A system according to claim 1, wherein said sound element database stores sound element data for generating a dial tone.

17. A system according to claim 1, wherein said sound element database stores sound element data for generating a voice message indicating an operation state of said first communication terminal.

18. A system according to claim 1, wherein said sound element database stores sound element data for generating a ring back tone.

19. A multimedia data communication system having communication terminals connected to each other, each communication terminal comprising:

a sound element database for storing sound element data for generating an audible sound indicating an operation state of said communication terminal;

a sending circuit for sending sound element data stored in said sound element database to another communication terminal; and a sound generating circuit for generating an audible sound on the basis of the sound element data, wherein the audible sound is composed of a continuous multi-cycle sound, said sound element database stores sound element data corresponding to a one-cycle audible sound, and said communication terminal, which stores sound element data, transmits one-cycle sound element data for generating an audible sound to the another communication terminal to cause the another communication terminal which has received the sound element data to continuously use the one-cycle sound element data and generate the audible sound composed of a continuous multi-cycle sound.

20. A multimedia data communication system having communication terminals connected to each other, each communication terminal comprising:

a sound element database for storing sound element data for generating an audible sound indicating an operation state of said communication terminal; and a sound generating circuit for generating an audible sound on the basis of the sound element data, wherein the audible sound is composed of a continuous multi-cycle sound, said sound element database stores sound element data corresponding to a one-cycle audible sound, and said communication terminal continuously uses the one-cycle sound element data to generate the audible sound composed of a continuous multi-cycle sound on the basis of a request from another communication terminal or an operation state of said communication terminal.

21. A multimedia communication system having communication terminals connected to each other, each communication terminal comprising:

a sound element data managing device including sound element database for storing sound element data for generating an audible sound indicating an operation state of said communication terminal, and a sending circuit for sending sound element data stored in said sound element database to another communication terminal; and a sound generating circuit for generating an audible sound on the basis of the sound element data, wherein the audible sound is composed of a continuous multi-cycle sound, said sound element database stores sound element data corresponding to a one-cycle audible sound, and said sound element data managing device transmits one-cycle sound element data to a designated communication terminal, on the basis of a request from said communication terminal, to cause said designated communication terminal which has received the sound element data to continuously use the one-cycle sound element data and generate the audible sound composed of a continuous multi-cycle sound.

22. A system according to claim 19, wherein said sound element database stores sound element data for generating a hold sound.

23. A system according to claim 19, wherein said sound element database stores sound element data for generating a dial tone.

24. A system according to claim 19, wherein said sound element database stores sound element data for generating a voice message indicating the operation state of said communication terminal.

25. A system according to claim 19, wherein said sound element database stores sound element data for generating a ring back tone.

26. A multimedia data communication system comprising:

communication terminals for transmitting/receiving information data in accordance with a first communication protocol;

a communication network for transmitting information data in accordance with a second communication protocol;

communication interfaces each converting a communication protocol between the communication terminals and the communication network;

means for storing sound element data for generating an audio message indicating user information of the communication terminals and an operation state of the communication terminals; and means, when a first communication terminal is to originate a call to a second communication terminal, for reading from the storing means sound element data for generating the audio message indicating user information of the second communication terminal and an operational state of the second communication terminal, converting readout sound element data into the audio message, and supplying the converted audio message to the first communication terminal.

* * * * *